US012633955B2

(12) United States Patent
Kim et al.

(10) Patent No.: US 12,633,955 B2
(45) Date of Patent: May 19, 2026

(54) ELECTRONIC DEVICE INCLUDING ANTENNA

(71) Applicant: Samsung Electronics Co., Ltd., Gyeonggi-do (KR)

(72) Inventors: Sungsun Kim, Gyeonggi-do (KR); Joonwon Jang, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 678 days.

(21) Appl. No.: 18/082,138

(22) Filed: Dec. 15, 2022

(65) Prior Publication Data

US 2023/0336202 A1 Oct. 19, 2023

Related U.S. Application Data

(63) Continuation of application No. PCT/KR2022/020218, filed on Dec. 13, 2022.

(30) Foreign Application Priority Data

| Apr. 15, 2022 | (KR) | 10-2022-0047211 |
| May 9, 2022 | (KR) | 10-2022-0056658 |

(51) Int. Cl.
*H04B 1/40* (2015.01)
*H01Q 1/24* (2006.01)
(Continued)

(52) U.S. Cl.
CPC .............. *H04B 1/40* (2013.01); *H01Q 1/243* (2013.01); *H01Q 1/526* (2013.01); *H01Q 5/307* (2015.01)

(58) Field of Classification Search
CPC .......... H04B 1/40; H01Q 5/307; H01Q 1/243; H01Q 1/526
See application file for complete search history.

(56) References Cited

U.S. PATENT DOCUMENTS

| 3,351,947 A | 11/1967 | Hart |
| 9,300,025 B2 | 3/2016 | Herbsommer et al. |
| | (Continued) | |

FOREIGN PATENT DOCUMENTS

| JP | 2004-40695 A | 2/2004 |
| JP | 2012-165453 A | 8/2012 |
| | (Continued) | |

OTHER PUBLICATIONS

International Search Report dated Mar. 17, 2023.

*Primary Examiner* — Junpeng Chen
(74) *Attorney, Agent, or Firm* — CANTOR COLBURN LLP

(57) ABSTRACT

An electronic device according to an embodiment includes a housing including at least one opening; a support member in the housing; a display disposed on the support member; a first printed circuit board including a plurality of layers; a first wireless communication circuit disposed on a first surface of the first printed circuit board; a feeding structure on another surface of the first printed circuit board electrically connected to the first wireless communication circuit; and a waveguide configured to transmit a signal provided from the first wireless communication circuit to an outside of the housing, and the waveguide extends along one surface of the support member from the feeding structure. Other embodiments are possible.

20 Claims, 24 Drawing Sheets

(51) Int. Cl.
   *H01Q 1/52*     (2006.01)
   *H01Q 5/307*    (2015.01)

(56)             References Cited

U.S. PATENT DOCUMENTS

| | | |
|---|---|---|
| 9,620,851 B2 | 4/2017 | Shimura et al. |
| 11,581,662 B2 | 2/2023 | Yoon et al. |
| 11,955,698 B2 * | 4/2024 | Moallem ................. G01S 7/028 |
| 2004/0119646 A1 | 6/2004 | Ohno et al. |
| 2013/0135159 A1 | 5/2013 | Goebel et al. |
| 2017/0324135 A1 * | 11/2017 | Blech ....................... H01Q 1/38 |
| 2018/0090816 A1 * | 3/2018 | Mow .................... H01Q 9/0421 |
| 2018/0233808 A1 | 8/2018 | Noori et al. |
| 2020/0144708 A1 | 5/2020 | Kim et al. |
| 2020/0163204 A1 * | 5/2020 | Kim ......................... H01Q 1/44 |
| 2021/0119338 A1 | 4/2021 | Avser et al. |
| 2021/0234260 A1 | 7/2021 | Thai et al. |
| 2021/0400802 A1 * | 12/2021 | Kim ...................... H01Q 1/243 |
| 2022/0006486 A1 | 1/2022 | Rajagopalan et al. |
| 2022/0077566 A1 | 3/2022 | Jo et al. |
| 2022/0094040 A1 | 3/2022 | Choi et al. |
| 2022/0159826 A1 * | 5/2022 | Yun ........................... H01P 3/12 |
| 2025/0062527 A1 * | 2/2025 | Franson .................. H01Q 1/48 |

FOREIGN PATENT DOCUMENTS

| | | |
|---|---|---|
| KR | 10-2020-0057962 A | 5/2020 |
| KR | 10-2020-0132490 A | 11/2020 |
| KR | 10-2021-0017215 A | 2/2021 |
| KR | 10-2265616 B1 | 6/2021 |
| KR | 10-2022-0003980 A | 1/2022 |
| KR | 10-2474588 B1 | 12/2022 |
| KR | 10-2623324 B1 | 1/2024 |
| KR | 10-2639685 B1 | 2/2024 |
| WO | 2021/261761 A1 | 12/2021 |

* cited by examiner

650

ELECTRONIC DEVICE INCLUDING ANTENNA

CLAIM OF PRIORITY

This application is a continuation application, claiming priority under § 365(c), of an International application No. PCT/KR2022/020218, filed on Dec. 13, 2022, which is based on and claim priority to Korean Patent Application No. 10-2022-0047211 filed Apr. 15, 2022, and 10-2022-0056658 filed May 9, 2022, in the Korean Intellectual Property Office, and incorporated herein by reference in their entirety.

BACKGROUND

Technical Field

Embodiments to be described later relate to an electronic device including an antenna.

Background Art

A portable electronic device such as a smart phone, a tablet personal computer, etc. may establish a communication channel with an external electronic device such as a base station or another portable electronic device. Depending on a type of transmission line for transmitting a signal received from an external electronic device or a signal transmitted to an external electronic device, magnitude of the signal transmission loss may vary.

A portable electronic device may include an antenna for communication with an external electronic device. For large-capacity transmission or high-speed transmission, demand for an antenna supporting an ultra-high frequency band is increasing.

When a signal is transmitted through a transmission line (e.g., a coaxial cable, a strip line, or a microstrip line), a signal transmission loss may increase as frequency of the signal increases. There is a need for a method capable of reducing signal transmission loss in an ultra-high frequency band.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment, an electronic device may comprise a housing including at least one opening; a support member disposed in the housing; a display disposed on the support member; a first printed circuit board in the housing and including a plurality of layers; a first wireless communication circuit disposed on a first surface of the first printed circuit board; a feeding structure on a second surface of the first printed circuit board that is opposite to the first surface electrically connected to the first wireless communication circuit; and a waveguide configured to electrically connect to the first wireless communication circuit through the first printed circuit board in the housing and the feeding structure, and to transmit a signal to an outside of the housing, provided from the first wireless communication circuit. According to an embodiment, the waveguide may extend along one surface of the support member from the feeding structure. According to an embodiment, when looking vertically at the at least one opening, the at least one opening may overlap with a cross section of the waveguide, and the first wireless communication circuit may transmit or may receive a signal in a frequency band of 20 GHz or more and 300 GHz or less to or from an external electronic device through the waveguide.

According to an embodiment, an electronic device may comprise a housing including at least one opening; a support member disposed in the housing; a display disposed on the support member; a first surface, a second surface that is opposite to the first surface, and a plurality of layers disposed between the first surface and the second surface; a first printed circuit board in the housing includes a first wireless communication circuit disposed on the first surface and a first feeding structure on the second surface electrically connected to the first wireless communication circuit; a second printed circuit board in the housing including a plurality of layers; a first wireless communication circuit disposed on a third surface of the second printed circuit board; a first feeding structure on a fourth surface of the first printed circuit board that is opposite to the third surface electrically connected to the first wireless communication circuit; a first waveguide configured to electrically connected to the first wireless communication circuit through the first feeding structure and to transmit a signal provided from the first wireless communication circuit to the second wireless communication circuit; and a second waveguide configured to electrically connect to the second wireless communication circuit through the second feeding structure and to transmit a signal provided from the second wireless communication circuit to an outside of the housing. According to an embodiment, the second waveguide may extend along one surface of the support member from the second feeding structure. According to an embodiment, when looking vertically at the at least one opening, the at least one opening may overlap with the cross section of the second waveguide, and the second wireless communication circuit may transmit or may receive a signal in the frequency band of 20 GHz or more and 300 GHz or less to or from an external electronic device through the second waveguide.

DETAILED DESCRIPTION

An electronic device according to an embodiment can reduce transmission loss of a signal (e.g., a communication signal of 20 GHz or more) in an ultra-high frequency band by including a waveguide.

Certain embodiments may include an electronic device that can reduce signal distortion or interference by forming a feeding structure. The feeding structure includes a conductive pin electrically connected to a wireless communication circuit and a shield can. The shield can surrounds the conductive pin into which the waveguide is inserted.

The effects that can be obtained from the present disclosure are not limited to those described above, and any other effects not mentioned herein will be clearly understood by those having ordinary knowledge in the art to which the present disclosure belongs, from the following description.

Figure 1:
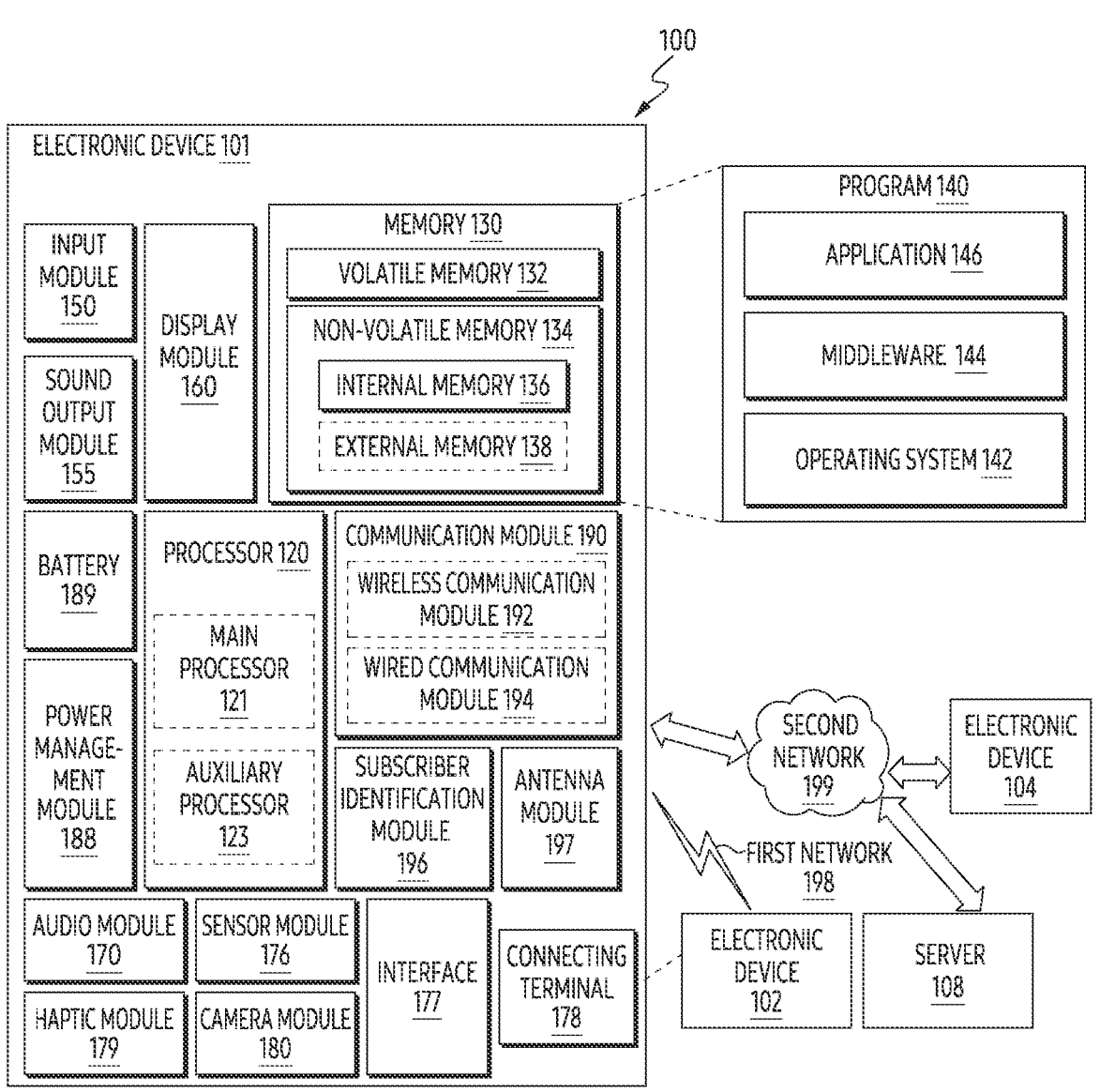
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
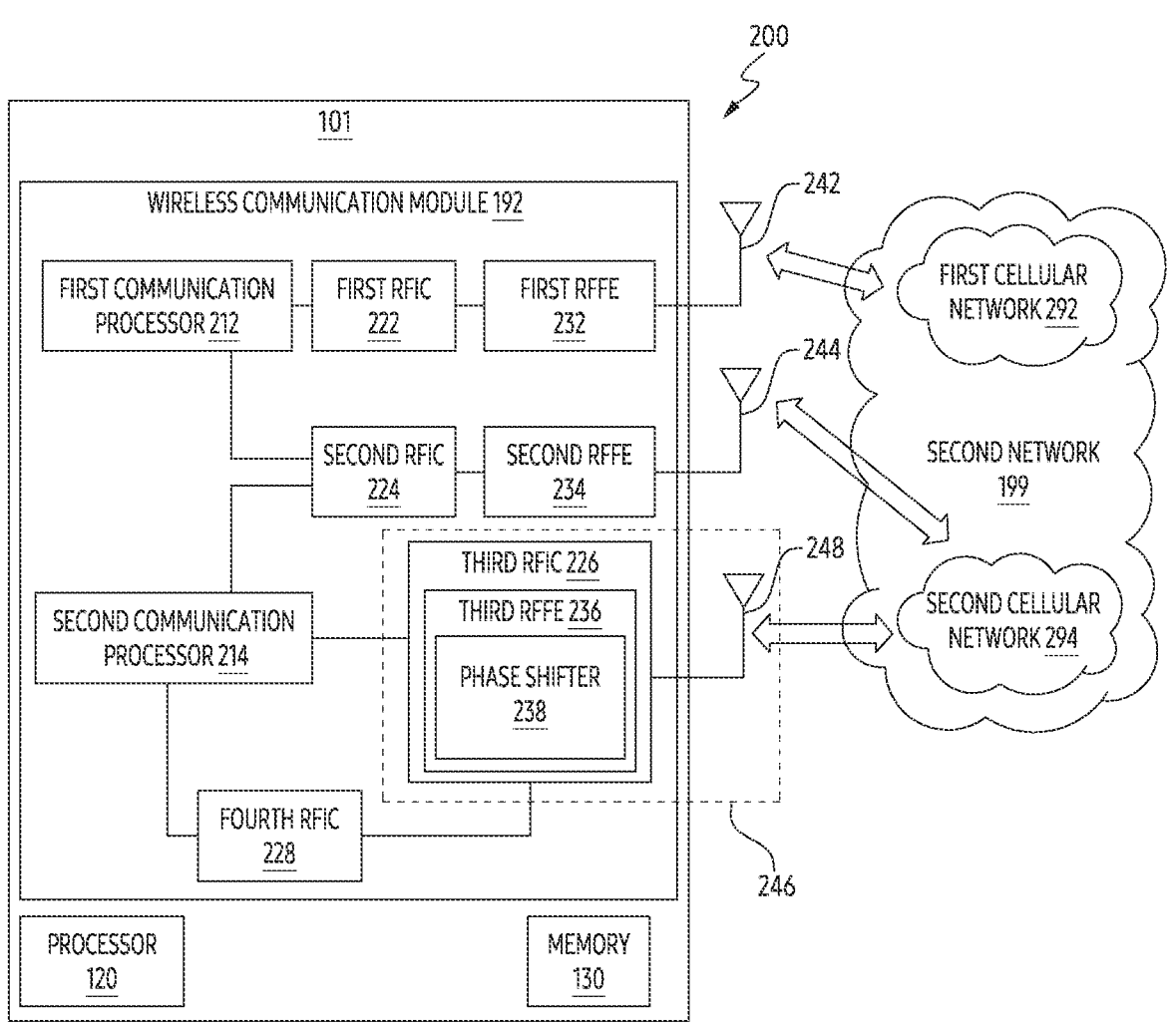
FIG. 2 is a block diagram of an electronic device for supporting legacy network communication and 5G network communication according to various embodiments.

FIG. 2 is a block diagram 200 of the electronic device 101 for supporting legacy network communication and 5G network communication, according to various embodiments.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to various embodiments, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
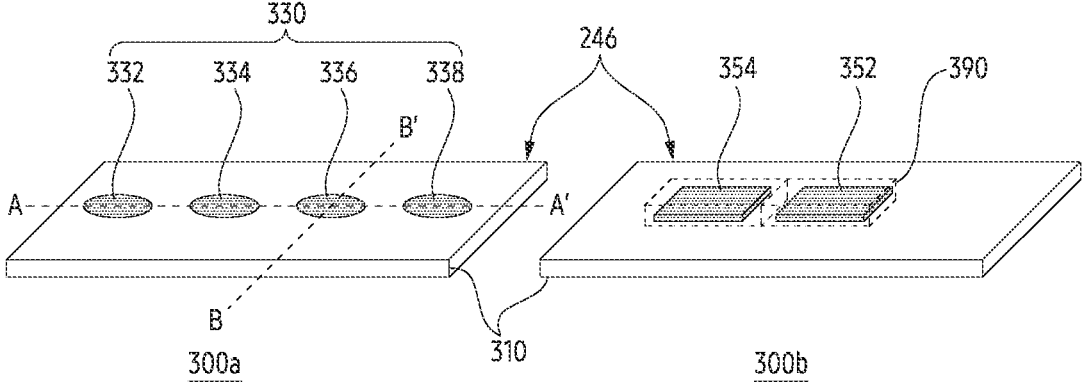
FIG. 3 illustrates an embodiment of a structure of an antenna module described with reference to FIG. 2.
Figure 3:
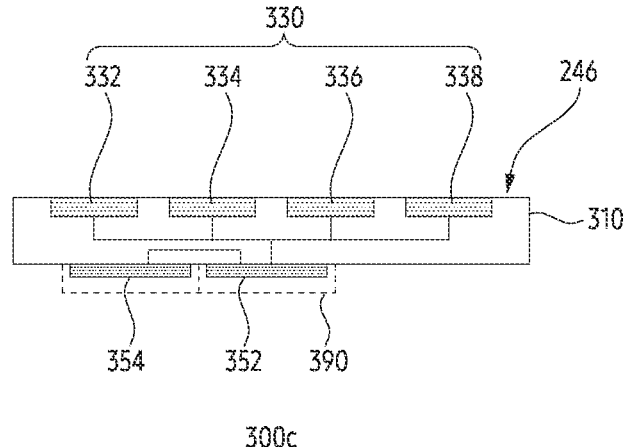

FIG. 3 illustrates an embodiment of a structure of an antenna module described with reference to FIG. 2.

300*a* of FIG. 3 is a perspective view of the third antenna module 246 as viewed from one side, and 300*b* of FIG. 3 is a perspective view of the third antenna module 246 as viewed from the other side. 300*c* of FIG. 3 is a cross-sectional view of A-A' of the third antenna module 246.

Referring to FIG. 3, in an embodiment, the third antenna module 246 may include a printed circuit board 310, an antenna array 330, a radio frequency integrated circuit (RFIC) 352, and a power manage integrated circuit (PMIC)

354, and a module interface (not shown). The third antenna module 246 may further optionally include a shielding member 390. In other embodiments, at least one of the aforementioned parts may be omitted, or at least two of the parts may be integrally formed.

The printed circuit board 310 may include a plurality of conductive layers and a plurality of non-conductive layers alternately stacked with the conductive layers. The printed circuit board 310 may provide electrical connection between various electronic components disposed on the printed circuit board 310 and/or outside, by using wires and conductive vias formed on the conductive layer.

The antenna array 330 (e.g., 248 in FIG. 2) may include a plurality of antenna elements 332, 334, 336, and 338 arranged to form a directional beam. The antenna elements may be formed on a first surface of the printed circuit board 310 as illustrated. According to another embodiment, the antenna array 330 may be formed inside the printed circuit board 310. According to embodiments, the antenna array 330 may include a plurality of antenna arrays (e.g., a dipole antenna array and/or a patch antenna array) of the same or different shape or type.

The RFIC 352 (e.g., the third RFIC 226 in FIG. 2) may be disposed in another region of the printed circuit board 310 (e.g., a second surface opposite to the first surface), spaced apart from the antenna array 330. The RFIC 352 may be configured to process a signal of a selected frequency band that is transmitted and received via the antenna array 330. According to an embodiment, upon transmission, the RFIC 352 may convert a baseband signal obtained from a communication processor (not illustrated) into an RF signal of a specified band. Upon reception, the RFIC 352 may convert an RF signal received via the antenna array 330 into a baseband signal and transmit the converted signal to the communication processor.

According to another embodiment, upon transmission, the RFIC 352 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 352 may down-convert the RF signal obtained via the antenna array 330 into an IF signal, and transmit the converted signal to the IFIC.

The PMIC 354 may be disposed in another partial region (e.g., the second surface) of the printed circuit board 310, spaced apart from the antenna array. The PMIC 354 may receive a voltage from a main PCB (not shown) and provide power required for various components (e.g., the RFIC 352) on antenna modules.

The shielding member 390 may be disposed on a part (e.g., the second surface) of the printed circuit board 310 in order to electromagnetically shield at least one of the RFIC 352 and the PMIC 354. According to an embodiment, the shielding member 390 may include a shield can.

Although not illustrated, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 352 and/or the PMIC 354 of the third antenna module 246 may be electrically connected to the printed circuit board.

Figure 4:
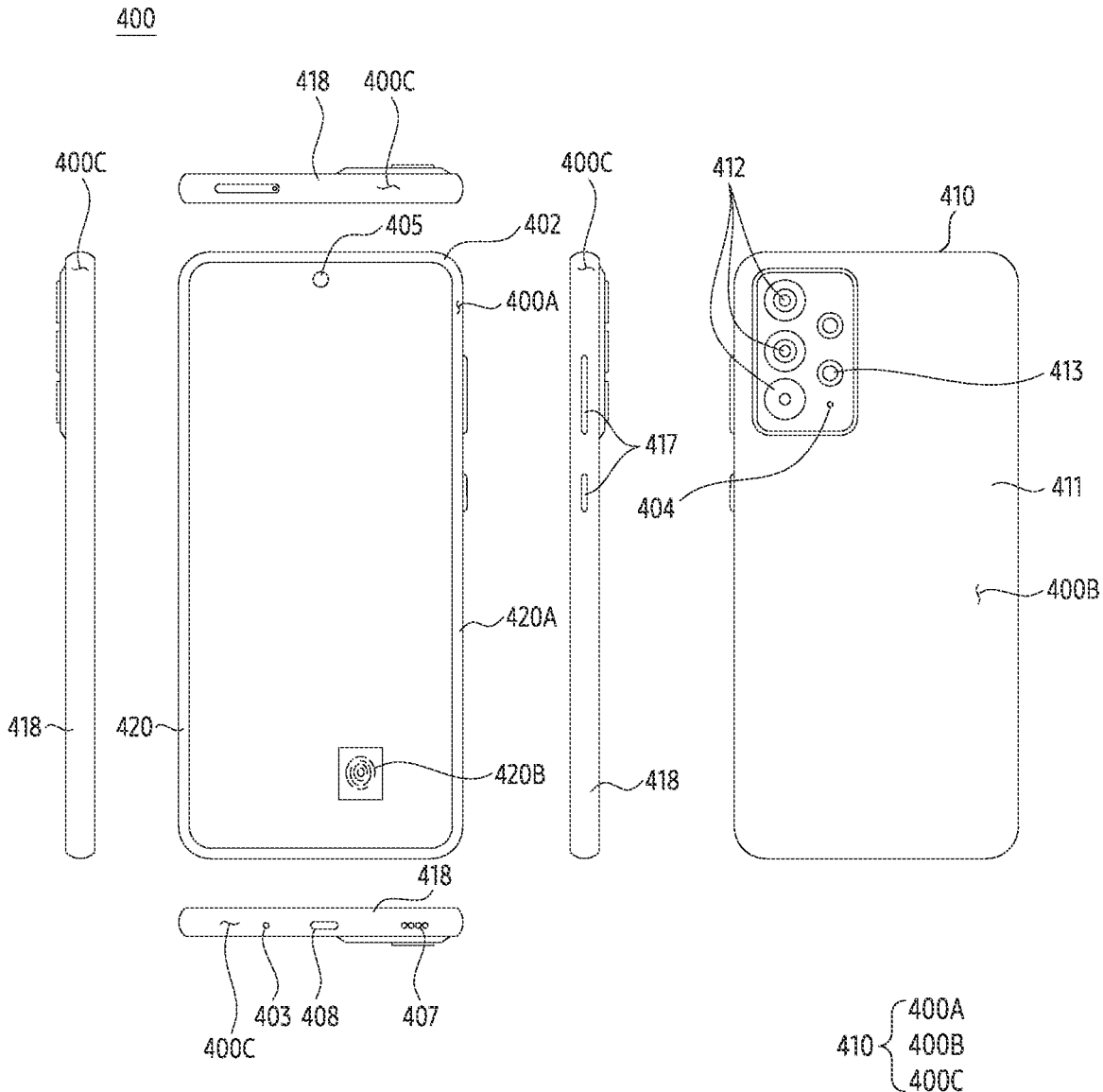
FIG. 4 is a diagram illustrating an electronic device according to an embodiment.

FIG. 4 is a diagram illustrating an electronic device according to an embodiment.

Referring to FIG. 4, an electronic device 400 (e.g., an electronic device 101 of FIG. 1) according to an embodiment may include a housing 410 forming an exterior of the electronic device 400. For example, the housing 410 may include a front surface 400A, a rear surface 400B, and a side surface 400C surrounding a space between the first surface 400A and the second surface 400B. In an embodiment, the housing 410 may refer to a structure (e.g., a frame structure 440 of FIG. 5) forming at least a portion of the first surface 400A, the second surface 400B, and/or the third surface 400C.

The electronic device 400 according to an embodiment may include a substantially transparent front plate 402. In an embodiment, the front plate 402 may form at least a portion of the first surface 400A. In an embodiment, the front plate 402 may include, for example, a glass plate including various coating layers or a polymer plate, but is not limited thereto.

The electronic device 400 according to an embodiment may include a substantially opaque rear plate 411. In an embodiment, the rear plate 411 may form at least a portion of the second surface 400B. In an embodiment, the rear plate 411 may be formed of coated or colored glass, ceramic, polymer, metal (e.g., aluminum, stainless steel (STS), or magnesium), or a combination of at least two of the above materials.

Figure 5:
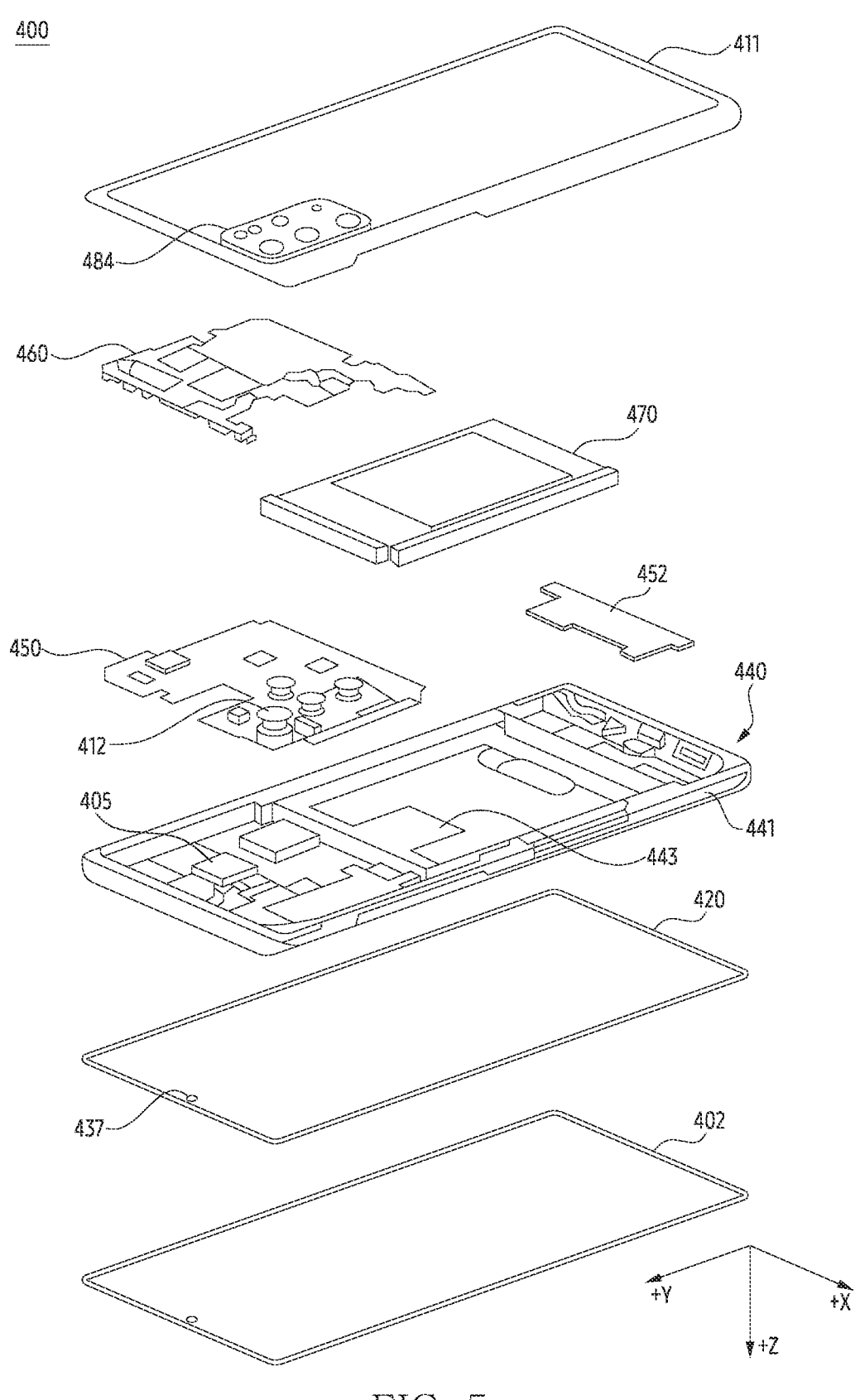
FIG. 5 is an exploded perspective view of an electronic device according to an embodiment.

The electronic device 400 according to an embodiment may include a side bezel structure (or side member) 418 (e.g., a side wall 441 of a frame structure 440 of FIG. 5). In an embodiment, the side bezel structure 418 may be coupled to the front plate 402 and/or the rear plate 411 to form at least a portion of the third surface 400C of the electronic device 400. For example, the side bezel structure 418 may form all of the third surface 400C of the electronic device 400, and for another example, the side bezel structure 418 may form the third surface 400C of the electronic device 400 together with the front plate 402 and/or the rear plate 411.

Unlike the illustrated embodiment, when the third surface 400C of the electronic device 400 is partially formed by the front plate 402 and/or the rear plate 411, the front plate 402 and/or the rear plate 411 may include a region that is bent from a periphery thereof toward the rear plate 411 and/or the front plate 402 and seamlessly extends. The extended region of the front plate 402 and/or the rear plate 411 may be positioned at both ends of, for example, a long edge of the electronic device 400, but is not limited to the above-described examples.

In an embodiment, the side bezel structure 418 may include a metal and/or a polymer. In an embodiment, the rear plate 411 and the side bezel structure 418 may be integrally formed and may include the same material (e.g., a metal material such as aluminum), but are not limited thereto. For example, the rear plate 411 and the side bezel structure 418 may be formed in separate configurations and/or may include different materials.

In an embodiment, the electronic device 400 may include at least one of a display 420, an audio module 403, 404, 407, a sensor module (not illustrated), a camera module 405, 412, 413, a key input device 417, a light emitting device (not illustrated), and/or a connector hole 408. In another embodiment, the electronic device 400 may omit at least one of the components (e.g., a key input device 417 or a light emitting device (not illustrated)), or may further include another component.

In an embodiment, the display 420 (e.g., a display module 160 of FIG. 1) may be visually exposed through a substantial portion of the front plate 402. For example, at least a portion of the display 420 may be visible through the front plate 402 forming the first surface 400A. In an embodiment, the display 420 may be disposed on the rear surface of the front plate 402.

In an embodiment, the appearance of the display 420 may be formed substantially the same as the appearance of the front plate 402 adjacent to the display 420. In an embodiment, in order to expand the area in which the display 420 is visually exposed, the distance between the outside of the display 420 and the outside of the front plate 402 may be formed to be generally the same.

In an embodiment, the display 420 (or the first surface 400A of the electronic device 400) may include a screen display area 420A. In an embodiment, the display 420 may provide visual information to a user through the screen display area 420A. In the illustrated embodiment, when the first surface 400A is viewed from the front, it is illustrated that the screen display area 420A is spaced apart from the outside of the first surface 400A and is positioned inside the first surface 400A, but it is not limited thereto. In another embodiment, when the first surface 400A is viewed from the front, at least a portion of the periphery of the screen display area 420A may substantially coincide with the periphery of the first surface 400A (or the front plate 402).

In an embodiment, the screen display area 420A may include a sensing area 420B configured to obtain biometric information of a user. Here, the meaning of "the screen display area 420A includes the sensing area 420B" may be understood to mean that at least a portion of the sensing area 420B may be overlapped on the screen display area 420A. For example, the sensing area 420B, like other areas of the screen display area 420A, may refer to an area in which visual information may be displayed by the display 420 and additionally biometric information (e.g., fingerprint) of a user may be obtained. In another embodiment, the sensing area 420B may be formed in the key input device 417.

In an embodiment, the display 420 may include an area in which the first camera module 405 (e.g., a camera module 180 of FIG. 1) is positioned. In an embodiment, an opening may be formed in the area of the display 420, and the first camera module 405 (e.g., a punch hole camera) may be at least partially disposed in the opening to face the first surface 400A. In this case, the screen display area 420A may surround at least a portion of the periphery of the opening. In another embodiment, the first camera module 405 (e.g., an under display camera (UDC)) may be disposed under the display 420 to overlap the area of the display 420. In this case, the display 420 may provide visual information to the user through the area, and additionally, the first camera module 405 may obtain an image corresponding to a direction facing the first surface 400A through the area of the display 420.

In an embodiment, the display 420 may be coupled to or disposed adjacent to a touch sensing circuit, a pressure sensor capable of measuring the intensity (pressure) of the touch, and/or a digitizer that detects a magnetic field type stylus pen.

In an embodiment, the audio modules 403, 404 and 407 (e.g., an audio module 170 of FIG. 1) may include microphone holes 403 and 404 and a speaker hole 407.

In an embodiment, the microphone holes 403 and 404 may include a first microphone hole 403 formed in a partial area of the third surface 400C and a second microphone hole 404 formed in a partial area of the second surface 400B. A microphone (not illustrated) for obtaining an external sound may be disposed inside the microphone holes 403 and 404. The microphone may include a plurality of microphones to detect the direction of sound.

In an embodiment, the second microphone hole 404 formed in a partial area of the second surface 400B may be disposed adjacent to the camera modules 405, 412 and 413. For example, the second microphone hole 404 may obtain sound according to operations of the camera modules 405, 412, and 413. However, it is not limited thereto.

In an embodiment, the speaker hole 407 may include an external speaker hole 407 and a receiver hole (not illustrated) for a call. The external speaker hole 407 may be formed on a portion of the third surface 400C of the electronic device 400. In another embodiment, the external speaker hole 407 may be implemented as one hole with the microphone hole 403. Although not illustrated, a receiver hole (not illustrated) for a call may be formed on another portion of the third surface 400C. For example, the receiver hole for a call may be formed on the opposite side of the external speaker hole 407 on the third surface 400C. For example, based on the illustration of FIG. 4, the external speaker hole 407 may be formed on the third surface 400C corresponding to the lower end of the electronic device 400, and the receiver hole for a call may be formed on the third surface 400C corresponding to the upper end of the electronic device 400. However, the present invention is not limited thereto, and in another embodiment, the receiver hole for a call may be formed at a position other than the third surface 400C. For example, the receiver hole for a call may be formed by a space spaced apart between the front plate 402 (or display 420) and the side bezel structure 418.

In an embodiment, the electronic device 400 may include at least one speaker (not illustrated) configured to output sound to the outside of the housing 410 through an external speaker hole 407 and/or a receiver hole (not illustrated) for a call.

In an embodiment, the sensor module (not illustrated) (e.g., a sensor module 176 of FIG. 1) may generate an electrical signal or data value corresponding to an internal operating state or an external environmental state of the electronic device 400. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 405, 412 and 413 (e.g., a camera module 180 of FIG. 1) may include a first camera module 405 disposed to face the first surface 400A of the electronic device 400, a second camera module 412 disposed to face the second surface 400B, and a flash 413.

In an embodiment, the second camera module 412 may include a plurality of cameras (e.g., a dual camera, a triple camera, or a quad camera). However, the second camera module 412 is not necessarily limited to including a plurality of cameras, and may include one camera.

In an embodiment, the first camera module 405 and the second camera module 412 may include one or a plurality of lenses, an image sensor, and/or an image signal processor.

In an embodiment, the flash 413 may include, for example, a light emitting diode or a xenon lamp. In another embodiment, two or more lenses (infrared camera, wide-angle and telephoto lens) and image sensors may be disposed on one side of electronic device 400.

In an embodiment, the key input device 417 (e.g., an input module 150 of FIG. 1) may be disposed on the third surface 400C of the electronic device 400. In another embodiment, the electronic device 400 may not include some or all of the key input devices 417, and the not included key input device 417 may be implemented on the display 420 in another form such as a soft key.

In an embodiment, the connector hole 408 may be formed on the third surface 400C of the electronic device 400 to accommodate the connector of the external device. A connection terminal (e.g., a connection terminal 178 of FIG. 1) electrically connected to the connector of the external device may be disposed in the connector hole 408. The electronic device 400 according to an embodiment may include an interface module (e.g., an interface 177 of FIG. 1) for processing electrical signals transmitted and received through the connection terminal.

In an embodiment, the electronic device 400 may include a light emitting device (not illustrated). For example, the light emitting device (not illustrated) may be disposed on the first surface 400A of the housing 410. The light emitting device (not illustrated) may provide state information of the electronic device 400 in a form of light. In another embodiment, the light emitting device (not illustrated) may provide a light source when the first camera module 405 is operated. For example, the light emitting device (not illustrated) may include an LED, an IR LED, and/or a xenon lamp.

FIG. 5 is an exploded perspective view of an electronic device according to an embodiment.

Hereinafter, overlapping descriptions of components having the same reference numerals as those of the above-described components will be omitted.

Referring to FIG. 5, the electronic device 400 according to an embodiment may include a frame structure 440, a first printed circuit board 450, a second printed circuit board 452, a cover plate 460, and a battery 470.

In an embodiment, the frame structure 440 may include a sidewall 441 forming an exterior (e.g., the third surface 400C of FIG. 4) of the electronic device 400 and a support portion 443 extending inward from the sidewall 441. In an embodiment, the frame structure 440 may be disposed between the display 420 and the rear plate 411. In an embodiment, the sidewall 441 of the frame structure 440 may surround a space between the rear plate 411 and the front plate 402 (and/or the display 420), and the support portion 443 of the frame structure 440 may extend from the sidewall 441 within the space.

In an embodiment, the frame structure 440 may support or accommodate other components included in the electronic device 400. For example, the display 420 may be disposed on one surface of the frame structure 440 facing one direction (e.g., the +z direction), and the display 420 may be supported by the support portion 443 of the frame structure 440. For another example, a first printed circuit board 450, a second printed circuit board 452, a battery 470, and a second camera module 412 may be disposed on the other surface facing a direction opposite to the one direction (e.g., the −z direction) of the frame structure 440. The first printed circuit board 450, the second printed circuit board 452, the battery 470, and the second camera module 412 may be mounted on a recess defined by the sidewall 441 and/or the support portion 443 of the frame structure 440.

In an embodiment, the first printed circuit board 450, the second printed circuit board 452, and the battery 470 may be coupled to the frame structure 440, respectively. For example, the first printed circuit board 450 and the second printed circuit board 452 may be fixedly disposed in the frame structure 440 through a coupling member such as a screw. For example, the battery 470 may be fixedly disposed on the frame structure 440 through an adhesive member (e.g., a double-sided tape). However, it is not limited by the above-described example.

In an embodiment, a cover plate 460 may be disposed between the first printed circuit board 450 and the rear plate 411. In an embodiment, the cover plate 460 may be disposed on the first printed circuit board 450. For example, the cover plate 460 may be disposed on a surface facing the −z direction of the first printed circuit board 450.

In an embodiment, the cover plate 460 may at least partially overlap the first printed circuit board 450 with respect to the z-axis. In an embodiment, the cover plate 460 may cover at least a partial area of the first printed circuit board 450. Through this, the cover plate 460 may protect the first printed circuit board 450 from physical impact or prevent the connector coupled to the first printed circuit board 450 from being separated.

In an embodiment, the cover plate 460 may be fixedly disposed on the first printed circuit board 450 through a coupling member (e.g., a screw), or may be coupled to the frame structure 440 together with the first printed circuit board 450 through the coupling member.

In an embodiment, the display 420 may be disposed between the frame structure 440 and the front plate 402. For example, a front plate 402 may be disposed on one side (e.g., a +z direction) of the display 420 and a frame structure 440 may be disposed on the other side (e.g., a −z direction).

In an embodiment, the front plate 402 may be coupled to the display 420. For example, the front plate 402 and the display 420 may adhere to each other through an optical adhesive member (e.g., optically clear adhesive (OCA) or optically clear resin (OCR)) interposed therebetween.

In an embodiment, the front plate 402 may be coupled to the frame structure 440. For example, the front plate 402 may include an outside portion extending outside the display 420 when viewed in the z-axis direction, and may adhere to the frame structure 440 through an adhesive member (e.g., a double-sided tape) disposed between the outside portion of the front plate 402 and the frame structure 440 (e.g., the sidewall 441). However, it is not limited by the above-described example.

In an embodiment, the first printed circuit board 450 and/or the second printed circuit board 452 may be equipped with a processor (e.g., a processor 120 of FIG. 1), a memory (e.g., a memory 130 of FIG. 1), and/or an interface (e.g., an interface 177 of FIG. 1). The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect the electronic device 400 to an external electronic device, and may include a USB connector, an SD card/MMC connector, or an audio connector. In an embodiment, the first printed circuit board 450 and the second printed circuit board 452 may be operatively or electrically connected to each other through a connection member (e.g., a flexible printed circuit board).

In an embodiment, the battery 470 may supply power to at least one component of the electronic device 400. For example, the battery 470 may include a rechargeable secondary cell or a fuel cell. At least a portion of the battery 470 may be disposed on substantially the same plane as the first printed circuit board 450 and/or the second printed circuit board 452.

The electronic device 400 according to an embodiment may include an antenna module (not illustrated) (e.g., an antenna module 197 of FIG. 1). In an embodiment, the antenna module may be disposed between the rear plate 411 and the battery 470. The antenna module may include, for example, a near field communication (NFC) antenna, a wireless charging antenna, and/or a magnetic secure transmission (MST) antenna. The antenna module, for example, may perform short-range communication with an external device, or wirelessly transmit and receive power to and from the external device.

In an embodiment, the first camera module 405 (e.g., a front camera) may be disposed in at least a portion (e.g., a support portion 443) of the frame structure 440 so that the lens may receive external light through a partial area (e.g., a camera area 137 of FIG. 4) of the front plate 402.

In an embodiment, the second camera module 412 (e.g., a rear camera) may be disposed between the frame structure 440 and the rear plate 411. In an embodiment, the second camera module 412 may be electrically connected to the first printed circuit board 450 through a connection member (e.g., a connector). In an embodiment, the second camera module 412 may be disposed such that the lens may receive external light through a camera area 484 of the rear plate 411 of the electronic device 400.

In an embodiment, the camera area 484 may be formed on the surface (e.g., a rear surface 400B of FIG. 4) of the rear plate 411. In an embodiment, the camera area 484 may be formed to be at least partially transparent so that external light may be incident to the lens of the second camera module 412. In an embodiment, at least a portion of the camera area 484 may protrude from the surface of the rear plate 411 to a predetermined height. However, it is not limited to thereto, and in another embodiment, the camera area 484 may form a plane substantially the same as the surface of the rear plate 411.

In an embodiment, the housing of the electronic device 400 may mean a configuration or structure forming at least a portion of the exterior of the electronic device 400. In this regard, at least a portion of the front plate 402, the frame structure 440, and/or the rear plate 411 forming the exterior of the electronic device 400 may be referred to as the housing of the electronic device 400.

Figure 6:
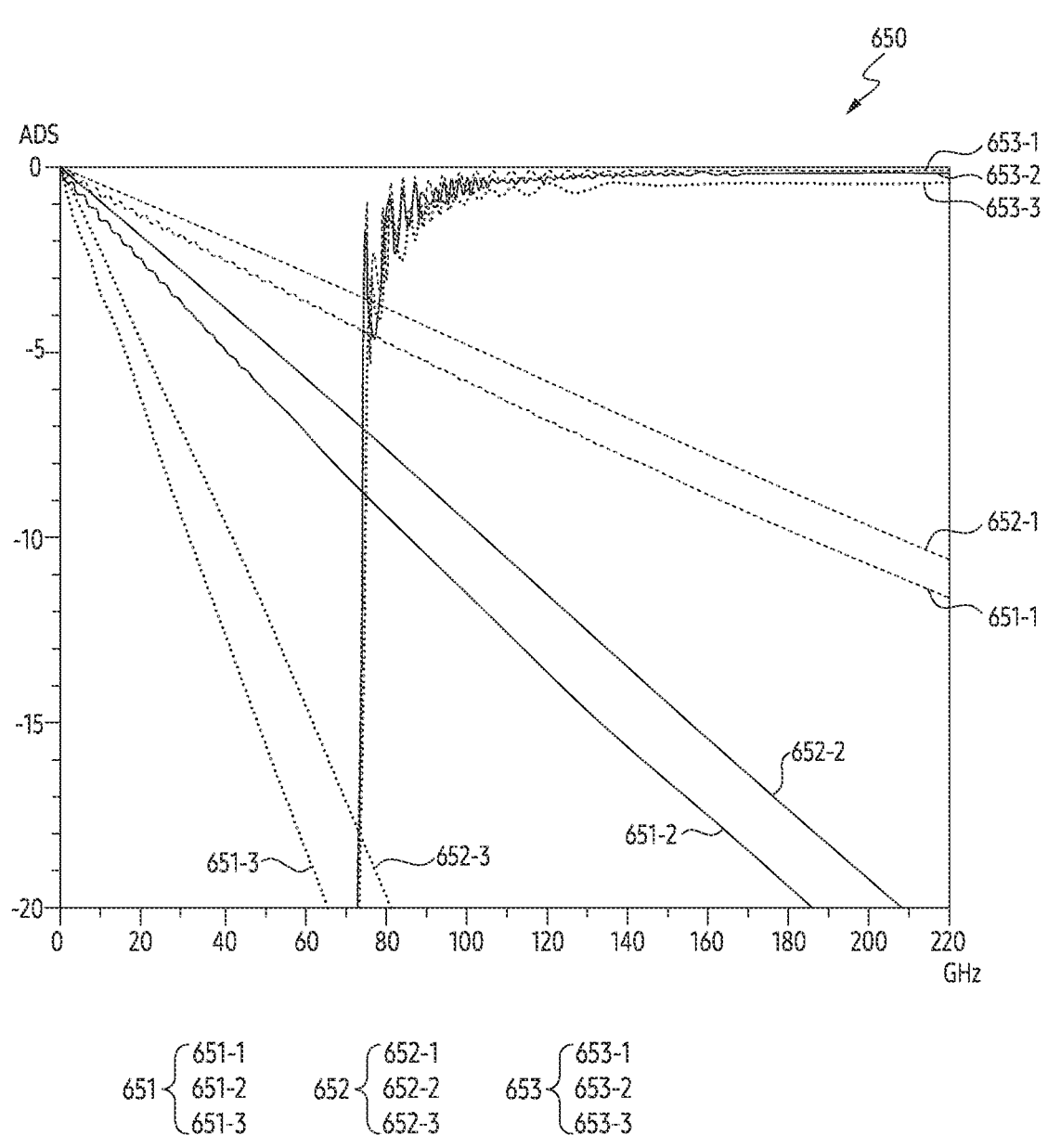
FIG. 6 is a graph illustrating a signal loss according to a type and a transmission length of a transmission line.

FIG. 6 is a graph illustrating a signal loss according to a type and a transmission length of a transmission line.

Referring to FIG. 6, a vertical axis of a graph 650 represents magnitude of the signal according to the frequency when the signal is transmitted through a transmission line inside an electronic device (e.g., the electronic device 400 of FIG. 3). A horizontal axis of the graph 650 represents frequency of a signal transmitted from inside the electronic device 400. The magnitude of the signal illustrated in the graph 650 may mean a ratio of output signal to input signal magnitude.

Referring to the graph 650, the signal loss may be different according to the type of transmission line. The signal loss may be a difference between magnitude of the input signal and magnitude of the output signal. A graph 651 represents output signal magnitude of a strip line. A graph 652 represents output signal magnitude of a microstrip line. A graph 653 represents output signal magnitude of a waveguide.

The strip line may have a greater transmission loss than the microstrip line. The waveguide may have less transmission loss than the strip line and the microstrip line in a specific frequency band (e.g., 100 GHz or more).

A graph 651-1, a graph 652-1, and a graph 653-1 indicate a signal loss having a signal transmission length of 25 (mm). A graph 651-2, a graph 652-2, and a graph 653-1 indicate a signal loss having a signal transmission length of 50 (mm). A graph 651-3, a graph 652-3 and a graph 653-3 indicate a signal loss having a signal transmission length of 130 mm. Referring to the graphs 651 and 652, a signal loss may increase as the signal transmission length increases. According to an embodiment, as the signal transmission length increases, the transmission loss of the signal transmitted through the microstrip line and the strip line may increase. For example, the transmission loss of the strip line and the microstrip line may be less than that of a 50 (mm) transmission line in a 25 (mm) transmission line.

Referring to graphs 651 and 652, the signal loss may vary according to frequency of the transmission signal. For example, the transmission loss of the strip line and the microstrip line may be less than that of a 100 GHz signal in a 50 GHz. The transmission loss of the strip line and the microstrip line may increase as the frequency increases.

Referring to the graph 653, the waveguide may maintain a transmission loss in a specific frequency band (e.g., 100 GHz or more) regardless of the length of the transmission line and the frequency of the transmission signal. For example, the graph 653-1, the graph 653-2, and the graph 653-3 may have substantially the same signal loss.

According to an embodiment, the waveguide may transmit a signal of a frequency band (e.g., 100 GHz to 300 GHz) used for 6G network communication. For example, the waveguide may be disposed inside an electronic device 400 supporting 6G network communication, and may transmit a signal for 6G network communication to an external electronic device or may receive it from an external electronic device.

According to an embodiment, the waveguide may have a small length limitation of a signal transmission path inside the electronic device 400. Even when a signal is transmitted to the outside through a side surface spaced far apart from a printed circuit board on which a communication module is disposed, a signal transmission loss may be small.

In the band below 30 GHz, the size of a square waveguide is required to be larger than 7.11 mm*3.56 mm (cutoff frequency 21.097 GHz, EIA notation WR-28), making it difficult to dispose it inside a narrow electronic device. The required cross-sectional area of the waveguide may be decrease as the frequency of the transmission signal increases. In an electronic device supporting a band of 100 GHz or more, the size of the waveguide may be reduced, and thus the waveguide may be disposed inside the electronic device. For example, the size of a square waveguide required in a frequency band above 100 GHz may be smaller than 1.7 mm*0.83 mm (cutoff frequency 90.909 GHz, EIA notation WR-7).

According to an embodiment, since the size of the waveguide for transmitting the high frequency signal is small, the electronic device may provide a space for disposing the waveguide for transmitting a signal having a frequency of 100 GHz or more.

Figure 7:
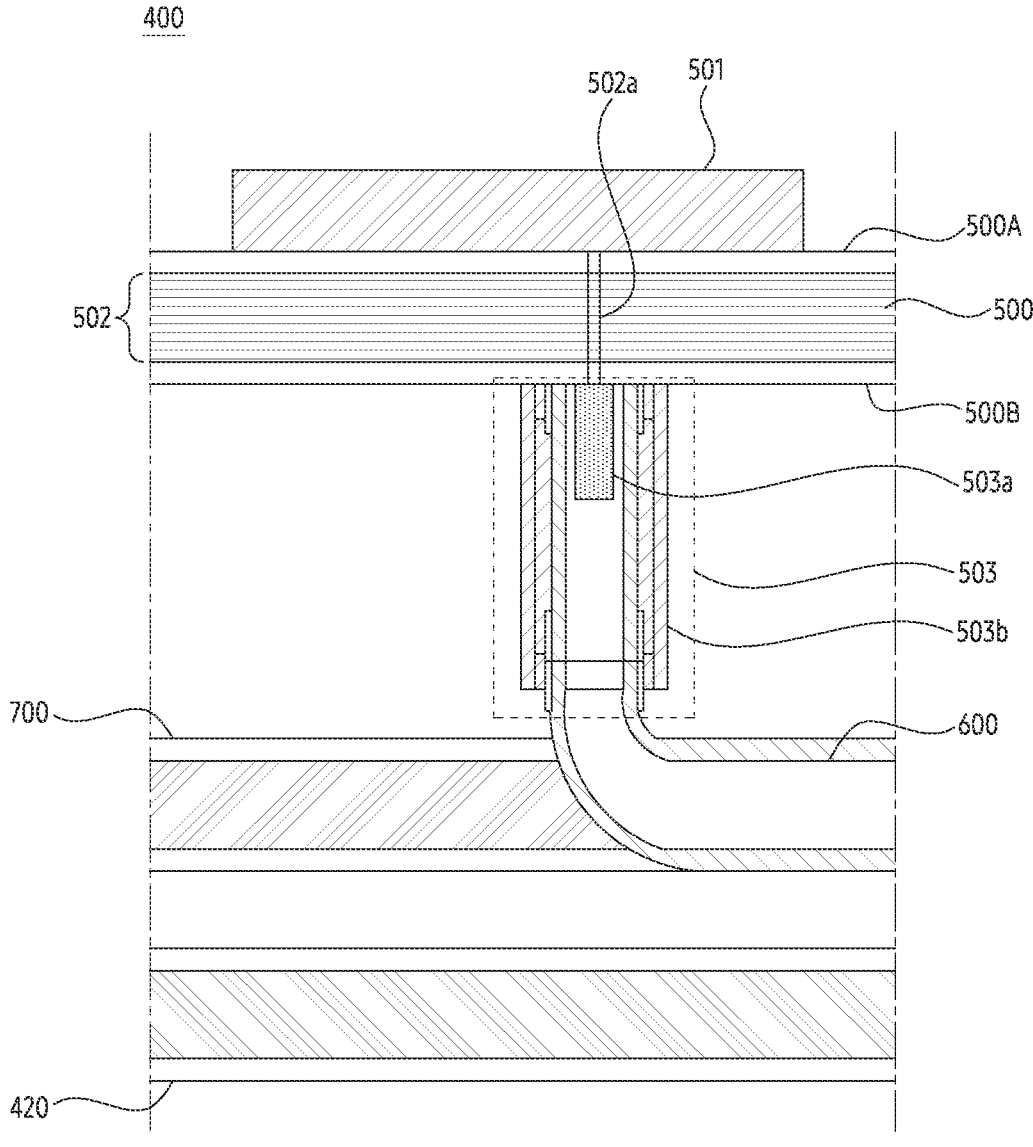
FIG. 7 is a cross-sectional view illustrating an internal arrangement of an electronic device to support 6G network communication according to an embodiment.

FIG. 7 is a cross-sectional view illustrating an internal arrangement of an electronic device to support 6G network communication according to an embodiment.

Referring to FIG. 7, an electronic device (e.g., an electronic device 400 of FIG. 4) may include a housing (e.g., a housing 410 of FIG. 4), a support member 700, a display 420, a waveguide 600, and a printed circuit board 500. The printed circuit board 500 may include a wireless communication circuit 501, layers 502, and a feeding structure 503.

According to an embodiment, the support member 700 may form a part of a housing 410 and may support an internal component of the electronic device 400. The support member 700 may be a frame structure (e.g., a frame structure 440 of FIG. 5) for supporting the internal component. The support member 700 may be disposed inside the electronic device 400 and may be supported by a side surface of the housing 410 (e.g., a side surface 400C of FIG. 4). The support member 700 may be a structure integrally formed with the side surface 400C of the housing 410 like the frame structure 440 of FIG. 4, or separated from the side surface 400C of the housing 410 and disposed in an internal space of the housing 410. The support member 700 may be an internal case of the electronic device 400. For example, the support member 700 may partition the internal space of the electronic device 400.

According to an embodiment, the support member 700 may include a material having rigidity and may support the display 420. For example, the support member 700 may be a structure formed of a metal, and may form a part of a front surface (e.g., a front surface 400A or a rear surface 400B of FIG. 4) of the housing 410. The support member 700 may support the display 420. The display 420 may be disposed on one surface of the support member 700. The support member 700 may be formed of a conductive material, and may function as a heat dissipation member that transmits heat generated from the display 420 and discharges the heat to the outside, or as a ground. However, the material of the support member 700 is not limited thereto.

According to an embodiment, the support member 700 may support the waveguide 600. For example, the waveguide 600 may be disposed on one surface of the support member 700. The waveguide 600 may be attached to the support member 700 through fusion bonding, an adhesive member, or an adhesive tape. For another example, the support member 700 and the waveguide 600 may be integrally formed. The waveguide 600 may form a part of the support member 700.

According to an embodiment, a part of the waveguide 600 may extend along one surface of the support member 700 within the support member 700, and the rest may extend from one surface of the support member 700 to the printed circuit board 500 or an antenna (e.g., an antenna 248 of FIG. 2). For example, a part of the waveguide 600 may be integrally formed with the support member 700 along one surface of the support member 700, and the rest may extend from one surface of the support member 700 to a second surface 500B of the printed circuit board 500.

According to an embodiment, the support member 700 may include an opening or recess for supporting a component of the electronic device 400. For example, the support member 700 may be integrated with the housing 410 like the frame structure 440, and the antenna may be seated in a recess defined by a sidewall of the frame structure 440 (e.g., a sidewall 441 of FIG. 4) and/or a support portion (e.g., a support portion 443 of FIG. 4).

According to an embodiment, the waveguide 600 may be disposed inside the housing 410. The waveguide 600 disposed in the housing 410 may have a constant cross-sectional shape. A first polarized wave and a second polarized wave orthogonal to the first polarized wave may cross each other while passing through a circular waveguide. The circular waveguide may have a circular shape having a constant diameter in cross section.

According to an embodiment, one end of the waveguide 600 may be coupled to a portion of the printed circuit board 500 to transmit or receive a signal from at least one processor (e.g., a processor 120 of FIG. 1, a first communication processor 212 or a second communication processor 214 of FIG. 2). The printed circuit board 500 may include a feeding structure 503 for transmitting a signal from a communication processor in the electronic device 400 to an antenna module in the electronic device 400 (e.g., a third antenna module 246 of FIG. 2). A first end of the waveguide 600 may be coupled to a part of the printed circuit board 500 through which a feeding signal is emitted in order to receive a signal. For example, a wireless communication circuit 501 on a first surface 500A of the printed circuit board 500 may be electrically connected to the feeding structure 503. The feeding structure 503 may feed a signal received from the wireless communication circuit 501 to the waveguide 600 disposed on second surface 500B of the printed circuit board 500. One end of the waveguide 600 may be connected to the feeding structure 503 disposed on the second surface 500B of the printed circuit board 500.

Figure 13A:
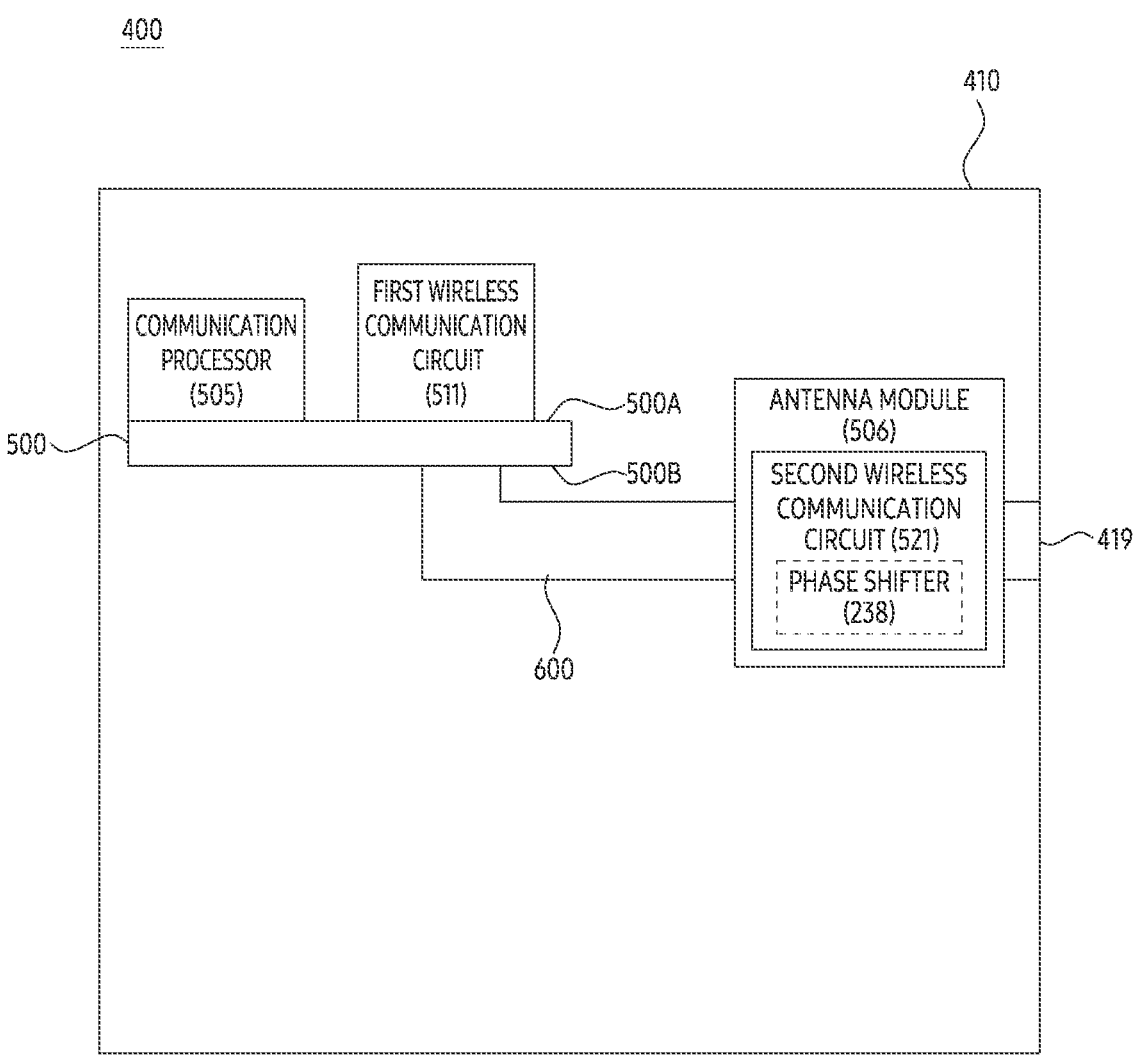
FIG. 13A is a block diagram of an electronic device including a waveguide and an antenna module according to an embodiment.

According to an embodiment, a second end of the waveguide 600 may be connected to the antenna module to transmit a wireless communication signal from one end of the waveguide 600 to an external electronic device or to receive the wireless communication signal from the external electronic device. For example, the antenna module may be disposed on an internal side surface 400C of the housing 410. In FIG. 13A, a connection structure between the antenna module disposed on the side surface of the housing 410 and the waveguide 600 will be described later.

According to an embodiment, the printed circuit board 500 may be connected to the wireless communication circuit 501 configured to feed to the waveguide 600. The printed circuit board 500 may further include a communication processor for supporting wireless network communication. According to an embodiment, the wireless communication circuit 501 may operate as an IFIC (e.g., a fourth RFIC 228 of FIG. 2) that transmits a down-converted signal to the communication processor or receives a signal from the communication processor to up-convert it. The IFIC may up-convert a baseband signal (hereinafter, a baseband signal) generated by the communication processor into an intermediate frequency signal (hereinafter, an intermediate frequency signal). The IFIC may down-convert the intermediate frequency signal received from the waveguide 600 into the baseband signal and transmit it to the communication processor. According to an embodiment, the wireless communication circuit 501 may operate as a RFIC that transmits the down-converted signal to the IFIC or up-converts the signal received from the IFIC. The RFIC may up-convert the intermediate frequency signal received from the IFIC into a signal of an RF frequency (hereinafter, an RF signal), and through the antenna of the electronic device 400, may transmit an RF signal to a cellular network (e.g., a second cellular network 294 of FIG. 2) (e.g., a 6G network) outside the electronic device 400 or an external electronic device. The RFIC may down-convert the RF signal received from the cellular network or the external electronic device outside the electronic device 400 into the intermediate frequency signal and transmit the down-converted signal to the IFIC.

According to an embodiment, it has been described that the electronic device 400 includes the IFIC and the RFIC, but the IFIC of the electronic device 400 may be omitted. For example, the wireless communication circuit 501 may operate as the RFIC. The wireless communication circuit 501 may up-convert the baseband signal received from the communication processor and transmit it to the external electronic device through the waveguide 600. The wireless communication circuit 501 may down-convert the RF signal received through the waveguide 600 and transmit it to the communication processor.

According to one embodiment, the printed circuit board 500 may include a plurality of layers 502. For example, the printed circuit board 500 may include a plurality of layers 502 disposed between the first surface 500A and the second surface 500B. The first surface 500A may face the wireless communication circuit 501, and the second surface 500B may face the waveguide 600 and the feeding structure 503. The layers 502 may include a conductive via 502a that transmits a signal provided from the wireless communication circuit 501 and penetrates the layers 502. The conductive via 502a may connect the feeding structure 503 and the wireless communication circuit 501. The wireless communication circuit 501 may be disposed on the first surface 500A and transmit the signal to the feeding structure 503 through the conductive via 502a. The feeding structure 503 may feed the communication signal to the waveguide 600 coupled to the second surface 500B.

According to an embodiment, the printed circuit board 500 may be electrically connected to the wireless communication circuit 501 and the feeding structure 503. The wireless communication circuit 501 disposed on the first surface 500A of the printed circuit board 500 may be connected to the feeding structure 503 through the conductive via 502a of the printed circuit board 500. The wireless communication signal may be fed to the waveguide 600 disposed on the second surface 500B through the feeding structure 503. One end of the waveguide 600 may be inserted into and coupled to a part of the feeding structure 503 disposed on the second surface 500B to which the wireless communication signal is fed.

According to an embodiment, the feeding structure 503 may include a conductive pin 503a and a shield can 503b. The conductive pin 503a may receive the signal from the wireless communication circuit 501 and may transmit the received signal to the waveguide 600. For example, the conductive pin 503a may be electrically connected to the wireless communication circuit 501 disposed on the first surface 500A of the printed circuit board 500 through the conductive via 502a. The conductive pin 503a may protrude from the second surface 500B of the printed circuit board 500 to feed the signal transmitted from the wireless communication circuit 501 to the waveguide 600.

According to an embodiment, the shield can 503b may surround the conductive pin 503a. A cross section of the shield can 503b may have a shape corresponding to a cross section of the waveguide 600 in order to insert the waveguide 600. The shield can 503b may be disposed on the second surface 500B of the printed circuit board 500 on which the waveguide 600 is disposed. The conductive pin 503a may protrude from the second surface 500B of the printed circuit board 500. The shield can 503b may provide a structure capable of coupling the waveguide 600 to the printed circuit board 500.

According to an embodiment, a first end of the shield can 503b may be in contact with the second surface 500B of the printed circuit board 500 to surround the conductive pin 503a, and the second end of the shield can 503b may accommodate the waveguide 600.

According to an embodiment, the shield can 503b may be made of at least one of stainless used steel (SUS) or a metal plated with nickel in order to reduce signal loss fed to the waveguide 600.

According to an embodiment, when the electronic device 400 is assembled, a part of the waveguide 600 may be inserted into the shield can 503b disposed on the printed circuit board 500. For example, the assembled electronic device 400 may press the waveguide 600 and the shield can 503b to couple them.

According to an embodiment, the signal fed to the waveguide 600 by the conductive pin 503a may be transmitted to the antenna module through the waveguide 600. For example, the conductive pin 503a may protrude from the second surface 500B of the printed circuit board 500. One end of the waveguide 600 connected to the feeding structure 503 disposed on the second surface 500B may include a part of the second surface 500B from which the conductive pin 503a protrudes. The other end of the waveguide 600 may be connected to the antenna module of the electronic device 400.

According to the above-described embodiment, the waveguide 600 may provide a signal line for transmitting a communication signal for a 6G network in the electronic device 400. Since the waveguide 600 is included in a part of the housing 410, the efficiency of the internal space of the electronic device 400 may be increased. The shield can 503b included in the feeding structure 503 may reduce the loss of a signal fed into the waveguide 600 and may provide a structure in which the waveguide 600 may be coupled to the feeding structure 503. The transmission loss of a signal in a band of 100 GHz or more transmitted through the waveguide 600 may be smaller than the transmission loss of a signal in a band of 100 GHz or more through a microstrip or strip line. The waveguide 600 for transmitting a signal of 100 GHz or more may be miniaturized to be disposed inside the electronic device.

Figure 8:
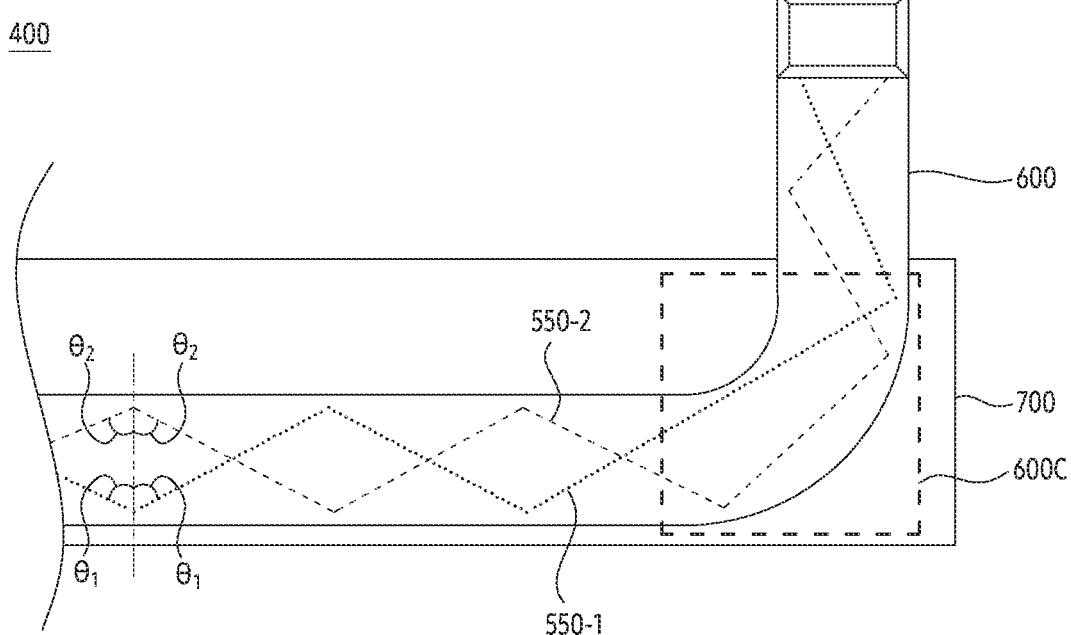
FIG. 8 is a side view of a waveguide, illustrating that a phase difference of polarized wave occurs according to a structure of the waveguide according to an embodiment.

FIG. 8 is a side view of a waveguide, illustrating that a phase difference of polarized wave occurs according to a structure of the waveguide according to an embodiment.

Referring to FIG. 8, at least a part of a waveguide 600 may be supported by a support member 700 or may be a part of the support member 700. The remaining part, which is distinct from the part of the waveguide 600, may extend from one surface of the support member 700 toward a printed circuit board 500 or an antenna in order to transmit a fed signal 550. For example, the waveguide 600 may be bent from the support member 700 toward the printed circuit board 500 or the antenna.

The waveguide 600 may include a corner region 600C to transmit a signal to the outside of an electronic device 400. For example, in order to be connected to an electronic component (e.g., an antenna module or a printed circuit board) spaced apart from the support member 700 in a direction perpendicular to the extension direction of the waveguide 600, the waveguide 600 may include the corner region. A part of the waveguide 600 may be included in the support member 700 having substantially the same thickness.

According to an embodiment, a plurality of signals 550-1 and 550-2 transmitted through the waveguide 600 including the corner region 600C may be transmitted through different transmission paths within the waveguide 600. For example, a first signal (e.g., a first polarized wave 550-1) may be transmitted in a path longer than a second signal (e.g., a second polarized wave 550-2). When the plurality of signals 550-1, 550-2 fed in the same phase pass through the waveguide 600, phases of each of the plurality of signals 550-1, 550-2 may be different from each other. A first polarized wave 550-1 may be fed to a first periphery of one end of the waveguide 600, and a second polarized wave 550-2 may be fed to a second periphery of one end of the waveguide 600. The first polarized wave 550-1 and the second polarized wave 550-2 may be fed in the same phase, cross perpendicularly to each other and pass through the inside of the waveguide 600. The corner region 600C of the waveguide 600 may change the length and shape of the proceeding path of the first polarized wave 550-1, thereby generating a phase difference from the second polarized wave 550-2. Due to the phase difference, synchronization of the plurality of signals 550-1 and 550-2 transmitted through the waveguide 600 may be required.

The electronic device 400 may include a phase shifter (e.g., a phase shifter 238 of FIG. 2). The phase shifter 238 may configured to adjust the phase of a plurality of signals. The phase shifter 238 may compensate for the phases of a plurality of signals being changed due to the structure of the waveguide 600 (e.g., the corner region 600C) to have the same phase. The phase shifter 238 may be included in a wireless communication circuit (e.g., a wireless communication circuit 501 of FIG. 7) of the electronic device 400. For example, the communication signal may be transmitted from a first printed circuit board including a communication processor or the wireless communication circuit operating as an IFIC to a second printed circuit board including the wireless communication circuit operating as an RFIC through the waveguide 600. Since the waveguide 600 includes at least one corner region 600C, signals including a plurality of polarized waves may have different phases. The wireless communication circuit disposed on the second printed circuit board and operating as the RFIC may further include the phase shifter 238 to synchronize the phase difference.

According to an embodiment, the plurality of signals 550-1 and 550-2 may be totally reflected when passing through the waveguide 600. Each of the plurality of signals may be adjusted such that an initial incident angle of each of the plurality of signals is greater than a threshold angle when fed into the waveguide 600 on order to be totally reflected. For example, a first incident angle $\theta_1$ of the first polarized wave 550-1 may be greater than a threshold angle in the waveguide 600 of the first polarized wave 550-1, and a second incident angle $\theta_2$ of the second polarized wave 550-2 may be greater than a threshold angle in the waveguide 600 of the second polarized wave 550-2.

According to an embodiment, the plurality of signals 550-1 and 550-2 transmitted in total reflection through the waveguide 600 including the corner region 600C may be transmitted in different transmission paths within the waveguide 600. Due to the changed transmission path, the phase difference may occur between the plurality of signals 550-1 and 550-2. For example, the first polarized wave 550-1 and the second polarized wave 550-2 may be fed in the same phase, cross perpendicularly to each other, and totally reflected to pass through the waveguide 600. The corner region 600C of the waveguide 600 may change the length and shape of the proceeding path of the first polarized wave 550-1, thereby generating the phase difference from the second polarized wave 550-2. Due to the phase difference, synchronization of the plurality of signals 550-1 and 550-2 transmitted through the waveguide 600 may be required. The phase shifter 238 may provide the plurality of signals 550-1 and 550-2 in which the phase difference is reduced or synchronized. According to the above-described embodiment, the electronic device 400 may synchronize signals occurred the phase difference due to the corner region 600C by including the phase shifter 238.

Figure 9A:
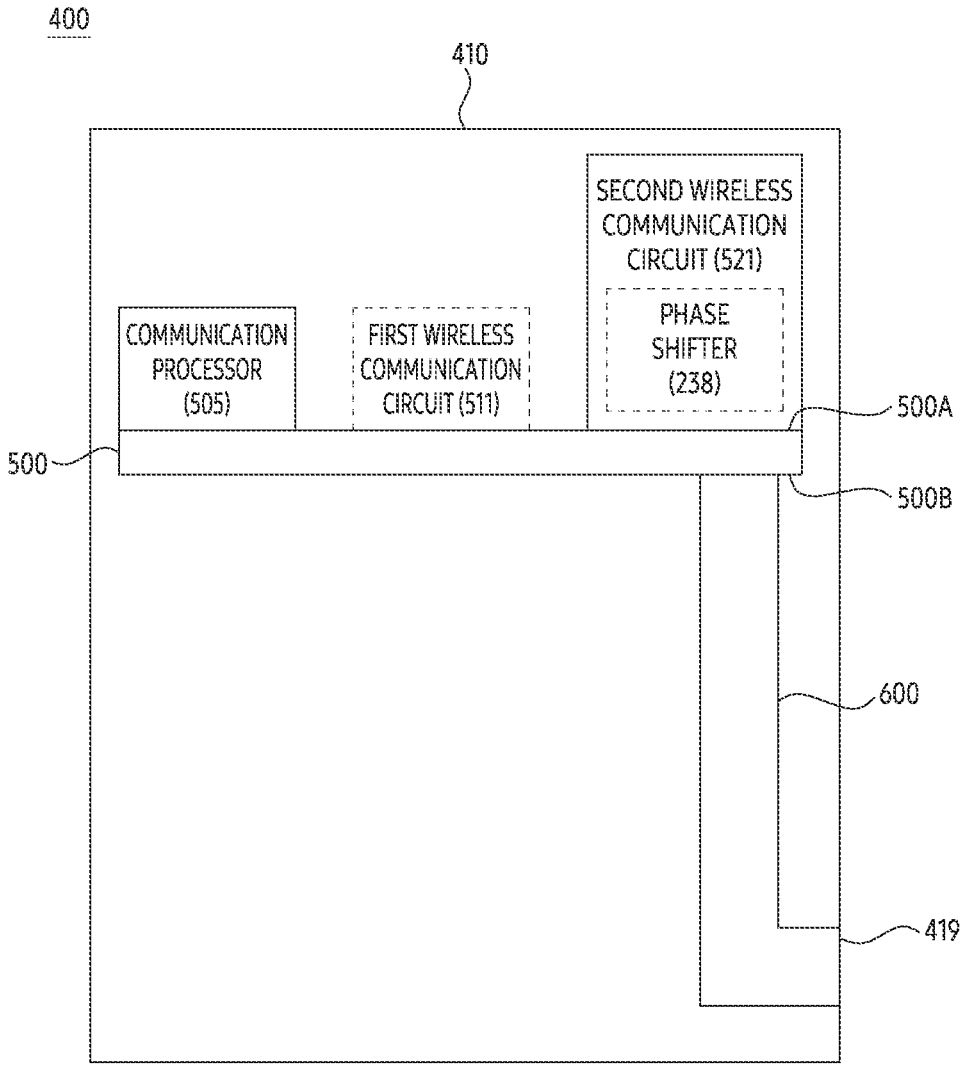
FIG. 9A is a block diagram of an electronic device including a waveguide according to an embodiment.

FIG. 9A is a block diagram of an electronic device including a waveguide according to an embodiment.

Referring to FIG. 9A, an electronic device 400 may include a printed circuit board 500, a communication processor 505, a first wireless communication circuit 511, a second wireless communication circuit 521, and a waveguide 600 inside the housing 410.

According to an embodiment, the communication processor 505, the first wireless communication circuit 511, and the second wireless communication circuit 521 may be disposed on a first surface 500A of the printed circuit board 500. The first wireless communication circuit 511 may operate as an IFIC (e.g., a fourth RFIC 228 of FIG. 2) that transmits a down-converted signal to the communication processor 505 or receives a signal from the communication processor and up-converts it. The second wireless communication circuit 521 may operate as a RFIC that transmits a signal down-converted to the first wireless communication circuit 511 or up-converts a signal received from the first wireless communication circuit 511.

According to an embodiment, the waveguide 600 may form a tunnel from an the second surface 500B of the printed circuit board 500 to at least one opening 419 of the housing 410.

According to an embodiment, a baseband signal generated by the communication processor 505 may be transmitted to the first wireless communication circuit 511 through a transmission line (e.g., a strip line, a micro-strip line) included in the printed circuit board 500. The first wireless communication circuit 511 may up-convert the baseband signal generated by the communication processor into an intermediate frequency signal. The first wireless communication circuit 511 may down-convert the intermediate frequency signal received from the second wireless communication circuit 521 into the baseband signal and transmit it to the communication processor 505 through the transmission line.

According to an embodiment, the intermediate frequency signal up-converted by the first wireless communication circuit 511 may be transmitted to the second wireless communication circuit 521 through the transmission line included in the printed circuit board 500. The second wireless communication circuit 521 may up-convert the intermediate frequency signal transmitted from the first wireless communication circuit 511 into an RF signal (e.g., 20 GHz to 300 GHz) to be transmitted to the waveguide 600. The second wireless communication circuit 521 may down-convert the RF signal received from an antenna of the electronic device 400 through the waveguide 600 into the intermediate frequency signal and transmit it to the first wireless communication circuit 511 through the transmission line.

According to an embodiment, the first wireless communication circuit 511 operating as the IFIC may be omitted. For example, the second wireless communication circuit 521 may up-convert the baseband signal received from the communication processor 505 into the RF signal. The second wireless communication circuit 521 may receive the RF signal from the waveguide 600 and may down-convert the received RF signal into the baseband signal. The baseband signal may be transmitted to the communication processor 505 through the transmission line.

According to an embodiment, the communication processor 505 may generate the plurality of signals to have a constant phase difference in order to match the phases of the plurality of signals transmitted through the waveguide 600 and transmitted to the outside. For example, due to a structure of the waveguide 600 (e.g., a corner region 600C of FIG. 8), the phase difference may occur between the plurality of signals. The second wireless communication circuit 521 may transmit the signal to the waveguide 600 by varying the phases of the plurality of signals by the phase difference of the signal transmitted through the waveguide 600 to the outside of the electronic device 400. Since the plurality of signals are transmitted to the waveguide 600 with different phases, the phases of the plurality of signals transmitted from the waveguide 600 to the outside of the electronic device 400 may be the same.

According to an embodiment, the second wireless communication circuit 521 may include a phase shifter (e.g., a phase shifter 238 of FIG. 2). The phase shifter 238 may adjust the phases of the plurality of signals that may be different due to the structure of the waveguide 600 (e.g., the corner region 600C). In consideration of a path that varies depending on the shape of the waveguide 600, the phase of each signal may be different and transmitted to the waveguide 600. The phase shifter 238 may be configured to transmit signals having the same phase to the outside of the electronic device 400.

According to an embodiment, the waveguide 600 may be configured to transmit a signal of 20 GHz or more fed from the second wireless communication circuit 521 to the antenna (e.g., the antenna 238 of FIG. 2) or an antenna module (e.g., a third antenna module 236 of FIG. 2) of the electronic device 400. For example, one end of the waveguide 600 may be connected to a feeding structure (e.g., a feeding structure 503 of FIG. 7) disposed on a second surface 500B facing (or opposite to) the first surface 500A on which the second wireless communication circuit 521 is disposed to feed a signal from the second wireless communication circuit 521. The other end of the waveguide 600 may be connected to the antenna disposed on an internal side surface of the housing 410 of the electronic device 400 (e.g., a side surface 400C of FIG. 4). The waveguide 600 may extend from one end connected to the feeding structure 503 to the antenna disposed on the internal side surface 400C of the housing 410.

According to an embodiment, the antenna may be an aperture antenna. The housing 410 of the electronic device 400 may include at least one opening 419 corresponding to the aperture antenna to transmit a wireless communication signal to an external electronic device or to receive the wireless communication signal from the external electronic device. The aperture antenna may be disposed between the other end of the waveguide 600 and the at least one opening 419 in order to transmit the signal fed from one end of the waveguide 600 to the external electronic device or receive the signal transmitted from the external electronic device. In order to operate as the aperture antenna, a portion of the housing 410 may be removed. According to an embodiment, the aperture antenna may be connected to or integrally formed with a cross section of the waveguide 600. In order to reduce distortion or damage of the communication signal, the aperture antenna and the waveguide 600 may be made of the same material.

According to an embodiment, the at least one opening 419 may be formed in the housing 410. The plurality of openings may be formed in the at least one opening 419 according to a use frequency. The at least one opening 419 may overlap a cross section of the other end of the antenna that faces one end of the antenna connected to the waveguide 600. The wireless communication signal passing through the waveguide 600 may be transmitted to the outside of the electronic device 400 through the antenna and the openings.

Figure 9B:
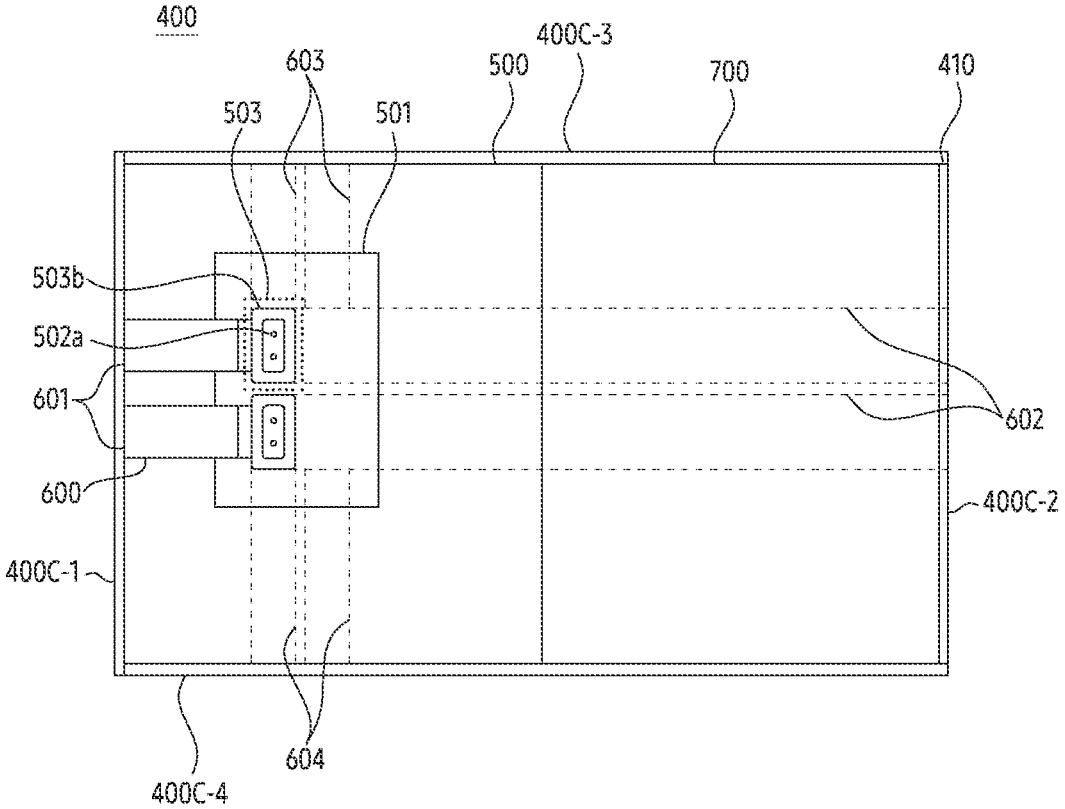
FIG. 9B is a front view of an electronic device in which a waveguide faces a side surface of a housing, according to an embodiment.
Figure 9C:
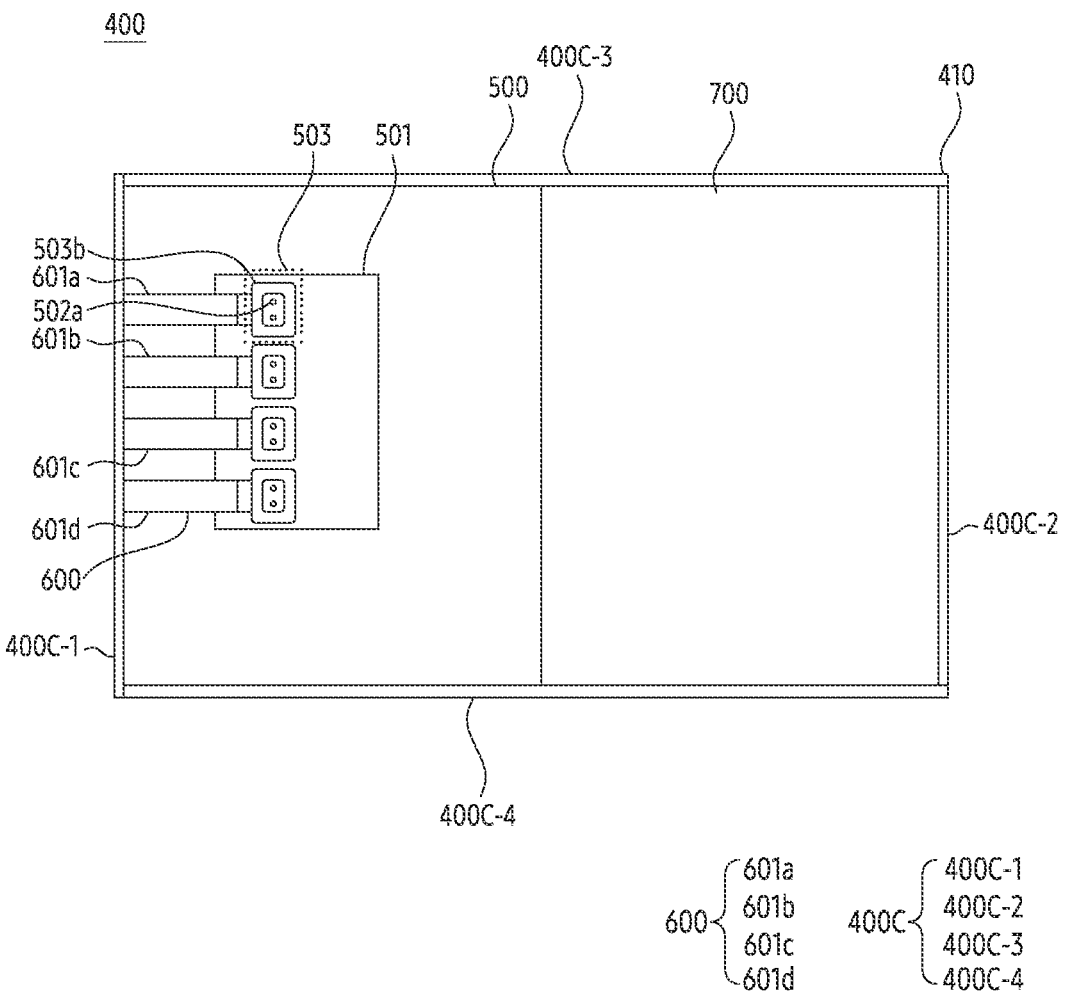
FIG. 9C is a front view of an electronic device including a plurality of waveguide according to an embodiment.
Figure 9D:
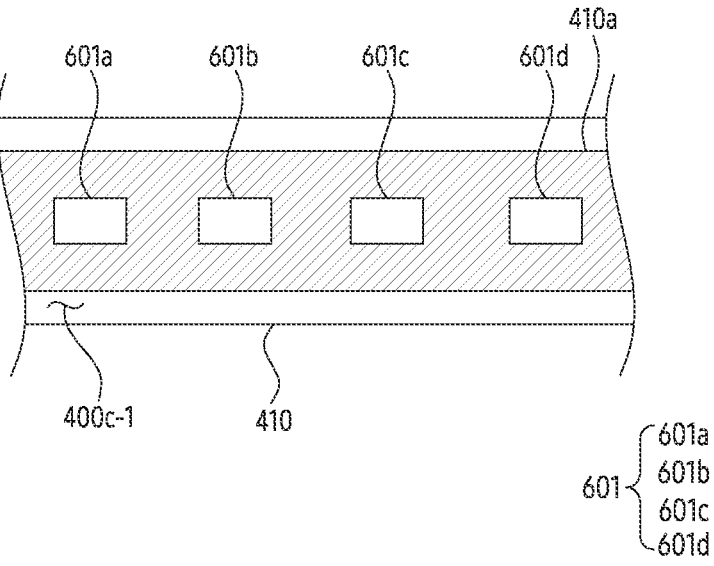
FIG. 9D is a side view of an electronic device in which a plurality of waveguides face one side surface of a housing, according to an embodiment.
Figure 9E:
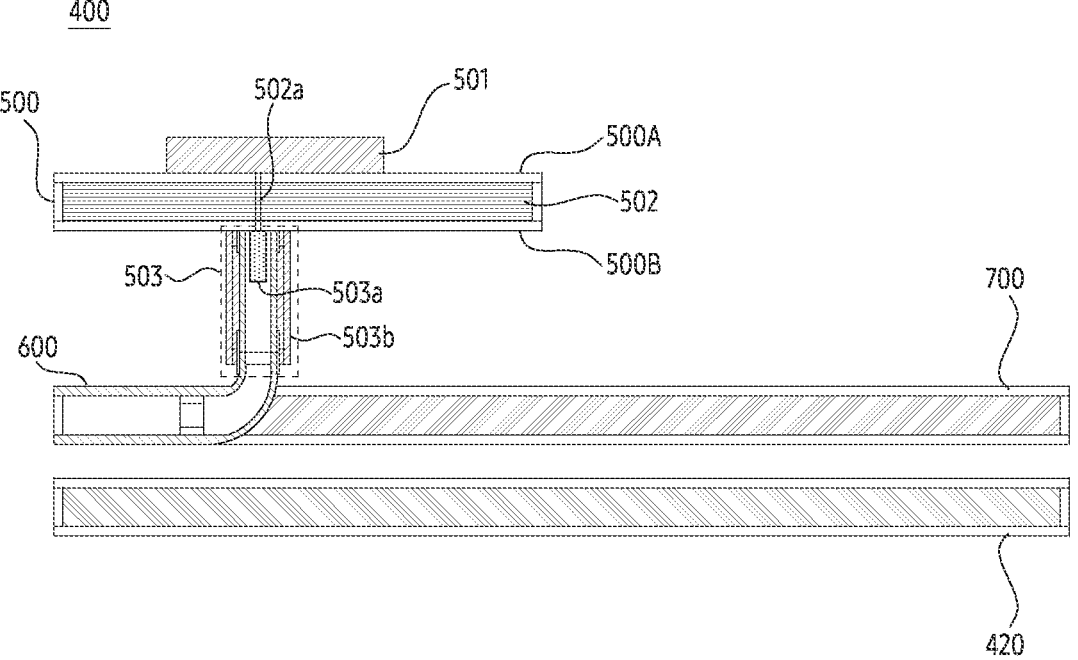
FIG. 9E is a side view of an electronic device in which a waveguide faces a side surface of a housing, according to an embodiment.
Figure 9F:
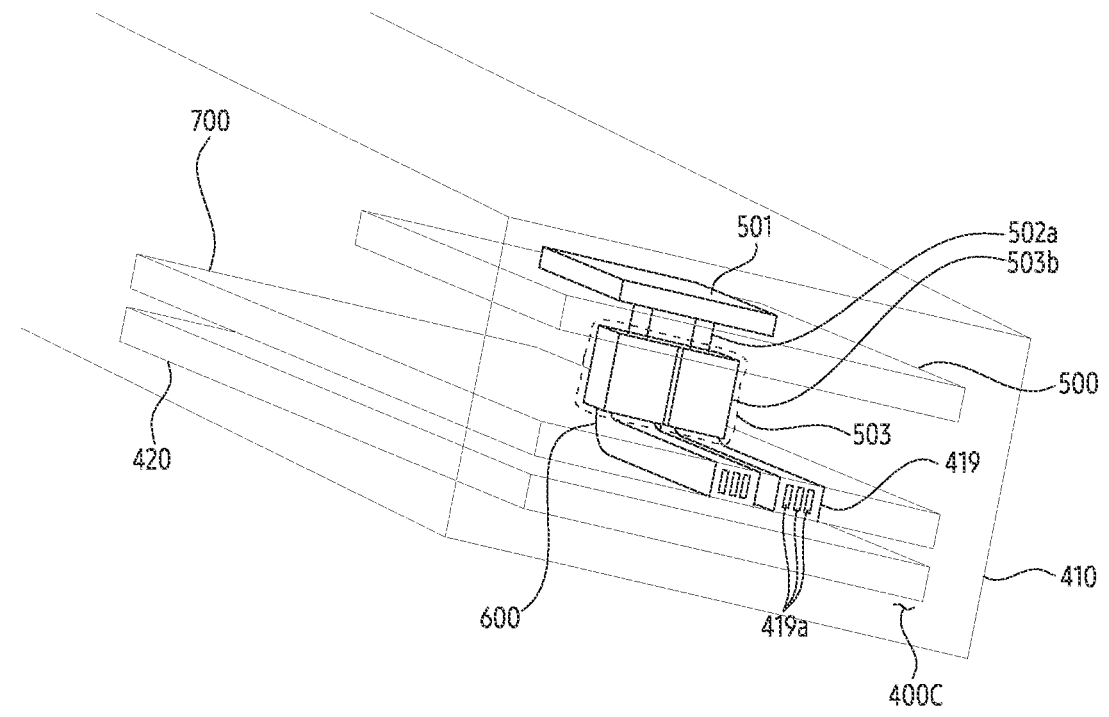
FIG. 9F is a perspective view of an electronic device in which a waveguide faces a side surface of a housing, according to an embodiment.

FIG. 9B is a front view of an electronic device in which a waveguide faces a side surface of a housing, according to an embodiment. FIG. 9C is a front view of an electronic device including a plurality of waveguide according to an embodiment. FIG. 9D is a side view of an electronic device in which a plurality of waveguides face one side surface of a housing, according to an embodiment. FIG. 9E is a side view of an electronic device in which a waveguide faces a side surface of a housing, according to an embodiment. FIG. 9F is a perspective view of an electronic device in which a waveguide faces a side surface of a housing, according to an embodiment.

Hereinafter, an overlapping description of a configuration having the same reference numerals as the above-described configuration will be omitted.

Referring to FIG. 9B, an electronic device 400 may include a housing 410, a support member 700, a waveguide 600, and a printed circuit board 500.

The support member 700 may be a part of the housing 410. For example, the support member 700 may be disposed inside the electronic device 400 to support a display (e.g., a display 420 of FIG. 4). The support member 700 may be integrally formed with the side surface (e.g., the side surface 400C of FIG. 4) configuring the housing 410 of the electronic device 400 and may extend to the side surface 400C.

According to an embodiment, the waveguide 600 may extend to at least one side surface among the side surfaces 400C of the housing 410. The waveguide 600 may be included in the support member 700 configuring a part of the housing 410. One end of the waveguide 600 may be connected to a feeding structure 503 disposed on one surface of the printed circuit board 500 for transmitting a wireless communication signal. Regardless of a distance and a direction to any one among the one surface of the side surfaces 400C of the housing 410, the waveguide 600 may extend from one end of the waveguide 600 to any one among one surface of the side surface 400C.

According to an embodiment, a plurality of waveguides 601, 602, 603, and 604 may extend from the feeding structure 503 disposed on the one surface of the printed circuit board 500 toward the side surface 400C of the housing 410. The plurality of waveguides 601, 602, 603, and 604 may have a different direction in which each waveguide extends toward the side surface 400C of the housing 410.

The housing 410 may include a first side surface 400C-1 facing a first direction, a second side surface 400C-2 facing the first side surface 400C-1, a third side surface 400C-3 perpendicular to the first side surface 400C-1 and disposed between the first side surface 400C-1 and the second side surface 400C-2, a fourth side surface 400C-4 facing the third side surface 400C-3.

For example, some 601 of the plurality of waveguide 600 may face the first side surface 400C-1, and the remaining part 603 of the plurality of waveguide 600 may face the third side surface 400C-3. However, it is not limited thereto, and each of the waveguide 600 may extend toward at least one of the first side 400C-1, the second side 400C-2, the third side 400C-3, and the fourth side 400C-4. For example, the waveguide 601 toward the first side 400C-1 may transmit a first signal, the waveguide 602 toward the second side 400C-2 may transmit a second signal, the waveguide 603 toward the third side 400C-3 may transmit a third signal, and the waveguide 604 toward the fourth side 400C-4 may transmit a fourth signal. The waveguides 601, 602, 603, and 604 transmitting each signal may be fed from a plurality of wireless communication circuits.

Referring to FIGS. 9C and 9D, the waveguide 601a, 601b, 601c, and 601d may extend to the first side surface 400C-1. According to an embodiment, the plurality of waveguide 601a, 601b, 601c, and 601d may transmit the same signal to the first side surface 400C-1. The waveguides 601a, 601b, 601c, and 601d may form an aperture antenna array. For example, the waveguides 601a, 601b, 601c, and 601d may extend toward the first side surface 400C-1, and end part of the waveguides 601a, 601b, 601c, and 601d may be disposed on the first side surface 400C-1. The first side surface 400C-1 of the housing 410 may include a non-conductive material 410a. When looking at the first side surface 400C-1, the non-conductive material 410a may overlap the ends of the waveguides 601a, 601b, 601c, and 601d. The ends of the waveguides 601a, 601b, 601c, and 601d may be spaced apart from each other at intervals. The electronic device 400 may provide an electromagnetic wave having directivity through the antenna array formed through ends of the waveguides 601a, 601b, 601c, and 601d spaced apart toward the first side surface 400C-1. For example, the electromagnetic wave emitted from the plurality of antenna arrays may form a beam.

According to an embodiment, as the waveguide supporting an ultra-high frequency band of 100 GHz or more has a small cross-sectional area, the efficiency of a space in which the waveguides are mounted may be increased. According to the increased space efficiency, the electronic device may dispose the plurality of waveguides extending from the wireless communication circuit 501 toward a side surface (e.g., the first side surface 400C-1) in one direction among the side surfaces 400C of the electronic device 400, and may provide a signal having directivity through the plurality of disposed waveguides.

Referring to FIGS. 9E and 9F, the display 420 may be disposed in at least a partial area of the support member 700 to be supported. The support member 700 may be disposed inside the electronic device 400 and may be supported by a side surface of the housing 410 (e.g., the side surface 400C of FIG. 4). The support member 700 may be integrally formed with the side surface 400C of the housing 410 like a frame structure 440 of FIG. 4.

According to an embodiment, a part of the waveguide 600 extends within the support member 700 along one surface of the support member 700 toward the side surface 400C of the housing 410, and the rest may extend from the one surface of the support member 700 to the printed circuit board 500 or an antenna (e.g., an antenna of FIG. 2). For example, the support member 700 may be integrally formed with the side surface 400C of the housing 410 like the frame structure 440 of FIG. 4. A part of the waveguide 600 may be integrally formed with the support member 700 along one surface of the support member 700 and may extend to the side surface 400C of the housing 410. The rest of the waveguide 600 may extend from one surface of the support member 700 to a second surface 500B of the printed circuit board 500.

According to an embodiment, at least one opening 419 formed on the side surface 400C of the housing 410 of the electronic device 400 may be further included. One end of the waveguide 600 may be connected to the feeding structure 503 disposed on one surface of the printed circuit board 500, and the other end of the waveguide 600 may be included in the support member 700 to face the side surface 400C of the housing 410.

The waveguide 600 may be connected to the at least one opening 419 formed on the side surface 400C of the housing 410. The housing 410 of the electronic device 400 may form the at least one opening 419 corresponding to an aperture antenna to transmit a wireless communication signal to an external electronic device or to receive it from the external electronic device.

According to an embodiment, the at least one opening 419 may include a plurality of openings 419a disposed along the side surface 400C of the housing 410. The plurality of openings 419a may overlap a cross section of the waveguide 600 toward the side surface 400C of the housing 410. However, it is not limited thereto. For example, each of the plurality of waveguides (e.g., the waveguides 601a, 601b, 601c, and 601d of FIG. 9C) may be connected to one opening.

According to an embodiment, the plurality of openings 419a may extend from a cross section of one end of the waveguide 600 and may overlap a cross section of the antenna corresponding to at least one opening 419 of the housing 410. The wireless communication signal passing through the waveguide 600 may be transmitted to the outside of the electronic device 400 through the openings 419a. For example, the wireless communication signal may be fed from the wireless communication circuit 501 on the printed circuit board 500 to the waveguide 600 through the feeding structure 503 electrically connected to a conductive via 502a, and passed through the waveguide 600 to transmit to the openings 419a operating as the antenna (e.g., the aperture antenna). The waveguide 600 may transmit the wireless communication signal to an antenna module, and the transmitted wireless communication signal may be transmitted to the outside of the housing 410 through the openings 419a.

According to the above-described embodiment, a part of the waveguide 600 may extend to the side surface 400C of the housing 410 along the support member 700 forming a part of the housing 410.

Figure 10A:
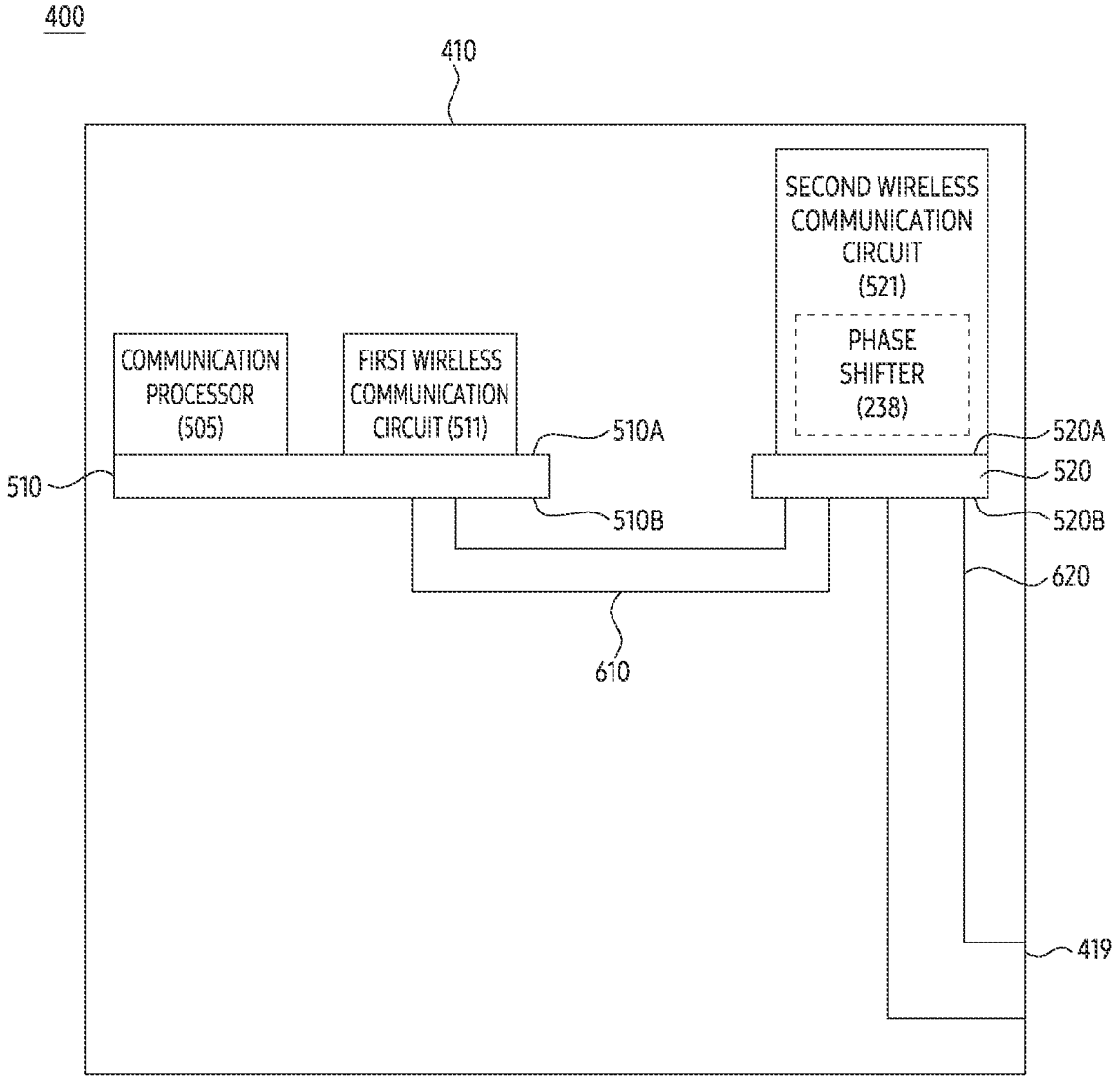
FIG. 10A is a block diagram of an electronic device including a plurality of waveguide according to an embodiment.
Figure 10B:
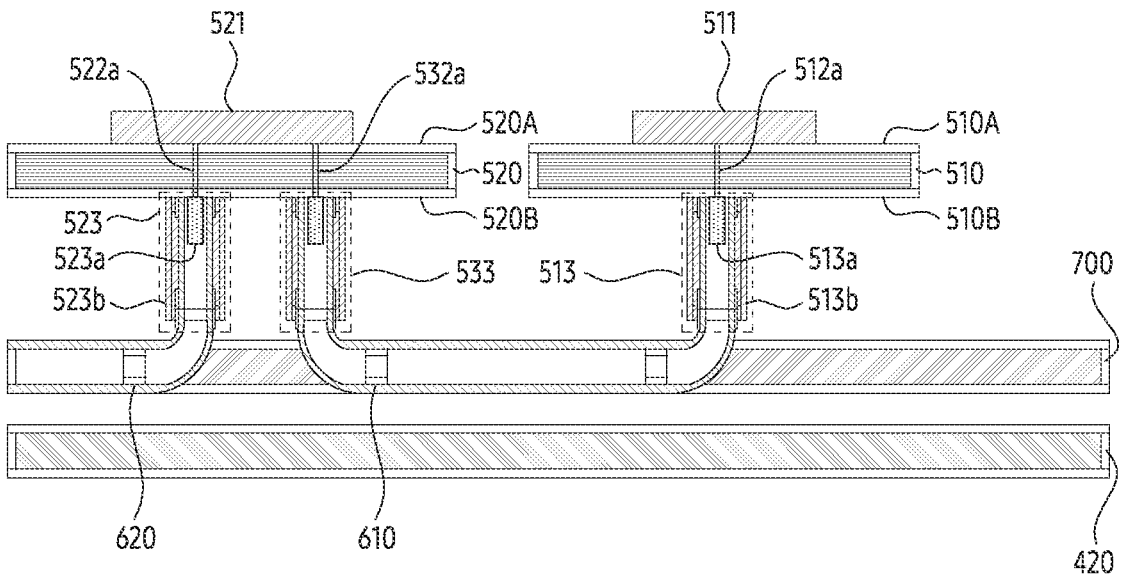
FIGS. 10B and 10C are side views of an electronic device including a plurality of waveguide according to an embodiment.
Figure 10C:
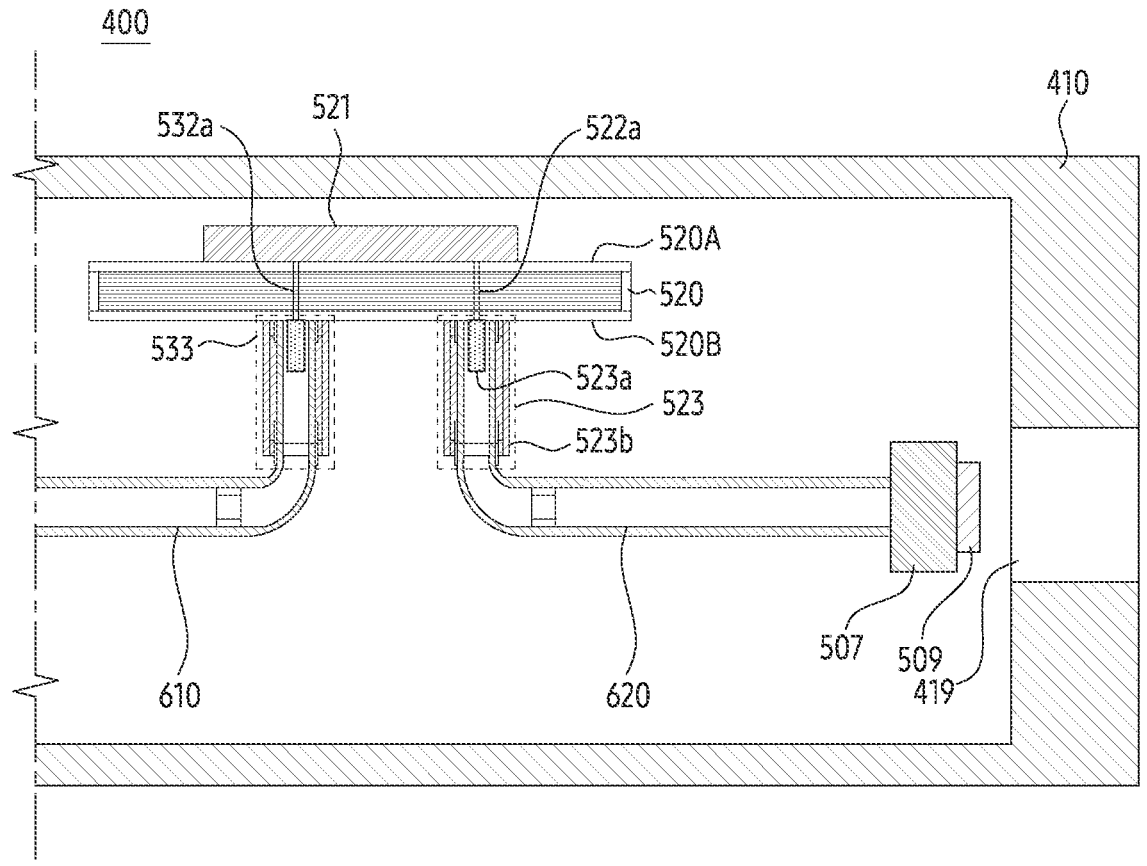

FIG. 10A is a block diagram of an electronic device including a plurality of waveguide according to an embodiment. FIGS. 10B and 10C are side views of an electronic device including a plurality of waveguide according to an embodiment.

Referring to FIG. 10A, an electronic device 400 may include a first printed circuit board 510, a second printed circuit board 520, a communication processor 505, a first wireless communication circuit 511, a second wireless communication circuit 521, a first waveguide 610, and a second waveguide 620 inside a housing 410.

According to an embodiment, a plurality of printed circuit boards may be disposed in the housing 410. The first printed circuit board 510 may be distinct from the second printed circuit board 520 and different wireless communication circuits may be disposed respectively. For example, the communication processor 505 and the first wireless communication circuit 511 for signal operation may be disposed on the first printed circuit board 510 (e.g., Main PCB), and the second wireless communication circuit 521 for signal transmission may be disposed on the second printed circuit board 520 (e.g., Sub PCB).

According to an embodiment, the communication processor 505 and the first wireless communication circuit 511 may be disposed on a third surface 510A of the first printed circuit board 510. The first wireless communication circuit 511 may operate as an IFIC e.g., a fourth RFIC 228 of FIG. 2) that transmits a down-converted signal to the communication processor 505 or receives and up-converts a signal from the communication processor. A baseband signal generated by the communication processor 505 may be transmitted to the first wireless communication circuit 511 through a transmission line (e.g., a strip line, a micro strip line) included in the first printed circuit board 510. The first wireless communication circuit 511 may up-convert the baseband signal generated by the communication processor 505 into an intermediate frequency signal. The first wireless communication circuit 511 may down-convert the intermediate frequency signal received from the first waveguide 610 into the baseband signal and transmit it to the communication processor 505 through the transmission line.

According to an embodiment, the second wireless communication circuit 521 may be disposed on a fifth surface 520A of the second printed circuit board 520. The second wireless communication circuit 521 may operate as a RFIC that transmits a signal down-converted to the IFIC or up-converts a signal received from the IFIC. The intermediate frequency signal up converted by the first wireless communication circuit 511 may be transmitted to the second wireless communication circuit 521 through the first waveguide 610. The second wireless communication circuit 521 may up-convert the intermediate frequency signal transmitted from the first wireless communication circuit 511 into a RF signal (e.g., 20 GHz to 300 GHz) and transmit the RF signal to the second waveguide 620. The second wireless communication circuit 521 may down-convert the RF signal received from an antenna of the electronic device 400 through the second waveguide 620 into the intermediate frequency signal and transmit it to the first wireless communication circuit 511 through the first waveguide 610.

According to an embodiment, the first waveguide 610 may form a tunnel from the fourth surface 510B of the first printed circuit board 510 to the sixth surface 520B of the second printed circuit board 520. The second waveguide 620 may form a tunnel from the sixth surface 520B to at least one opening 419.

According to an embodiment, the first waveguide 610 may be disposed between the first printed circuit board 510 and the second printed circuit board 520. A first end of the first waveguide 610 may be connected to a first feeding structure 513 disposed on a fourth surface 510B of the first printed circuit board 510. A second end of the first waveguide 610 may be connected to a third feeding structure 533 disposed on a sixth surface 520B of the second printed circuit board 520. The intermediate frequency signal transmitted from the first wireless communication circuit 611 may be transmitted to the second wireless communication circuit 521 through a signal line provided by the first waveguide 610. The second wireless communication circuit 521 may up-convert the intermediate frequency signal transmitted from the first wireless communication circuit 511 into an RF signal (e.g., 150 GHz to 300 GHz), and transmit it to the second waveguide 620. The second wireless communication circuit 521 may down-convert the RF signal received through the second waveguide 620 from the antenna (e.g., the antenna 238 of FIG. 2) of the electronic device 400 or an antenna module (e.g., a third antenna module 246 of FIG. 2) into the intermediate frequency signal, and transmit it to the first wireless communication circuit 511 through the first waveguide line.

According to an embodiment, the communication processor 505 may generate the plurality of signals to have a constant phase difference in order to match the phases of a plurality of signals transmitted through the first waveguide 610 and the second waveguide 620 and transmitted to the outside. For example, due to structures of the first waveguide 610 and the second waveguide 620 (e.g., a corner area 600C of FIG. 8), the plurality of signals may have the phase difference. The communication processor 505 may transmit a signal to the first waveguide 610 by varying the phases of the plurality of signals by the phase difference of the signal transmitted to the outside of the electronic device 400 through the second waveguide 620.

According to an embodiment, the second wireless communication circuit 521 may include a phase shifter (e.g., a phase shifter 238 of FIG. 2). The phase shifter 238 may adjust the phases of a plurality of signals that may be different due to the structure (e.g., a corner region 600C) of the first waveguide 610 and the second waveguide 620. In consideration of a path that varies depending on the shapes of the waveguides 610 and 620, the phase of each signal may be different and transmitted to the second waveguide 620. The phase shifter 238 may be configured to transmit signals having the same phase to the outside of the electronic device 400.

According to an embodiment, the second waveguide 620 may be configured to transmit a signal of 20 GHz or more fed from the second wireless communication circuit 521 to the antenna (e.g., the antenna 238 of FIG. 2) or the antenna module (e.g., the third antenna module 236 of FIG. 2) of the electronic device 400. For example, one end of the second waveguide 620 may be connected to a second feeding structure 523 disposed on the sixth surface 520B facing the fifth surface 520A on which the second wireless communication circuit 521 is disposed in order to feed a signal from the second wireless communication circuit 521. The other end of the waveguide 600 may be connected to an antenna disposed on an internal side surface of the housing 410 of the electronic device 400 (e.g., a side surface 400C of FIG. 4). The second waveguide 620 may extend from one end connected to the second feeding structure 523 to the antenna disposed on the internal side surface 400C of the housing 410.

According to an embodiment, the antenna may be an aperture antenna. The housing 410 of the electronic device 400 may include at least one opening 419 corresponding to the aperture antenna in order to transmit or receive a wireless communication signal to or from an external electronic device. The aperture antenna may be disposed between the other end of the second waveguide 620 and the at least one opening 419 to transmit a signal fed from one end of the second waveguide 620 to an external electronic device or to receive a signal transmitted from the external electronic device. In order to operate as the aperture antenna, a portion of the housing 410 may be removed. According to an embodiment, the aperture antenna may be connected to the cross section of the second waveguide 620 or may be integrally formed. In order to reduce distortion or damage to a communication signal, the aperture antenna and the second waveguide 620 may be made of the same material.

According to an embodiment, the at least one opening 419 may be formed in the housing 410. The wireless communication signal passing through the second waveguide 600 may be transmitted to the outside of the electronic device 400 through the at least one opening 419.

According to an embodiment, the shape or standard of the first waveguide 610 and the second waveguide 620 may be different depending on the type of frequency transmitted. For example, since the first waveguide 610 provides an intermediate frequency signal line and the second waveguide 620 provides an RF frequency signal line, the cross section or size of the first waveguide 610 and the second waveguide 620 may be different.

Hereinafter, an overlapping description of a configuration having the same reference numerals as the above-described configuration will be omitted.

Referring to FIG. 10B, the electronic device 400 may include the first feeding structure 513, the second feeding structure 523, and the third feeding structure 533. The first feeding structure 513 may include a first conductive pin 513a and a first shield can 513b. The second feeding structure 523 may include a second conductive pin 523a and a second shield can 523b. According to an embodiment, the third feeding structure 533 may be substantially the same as or similar to the first feeding structure 513.

According to an embodiment, the first conductive pin 513a may be disposed on one surface of the first printed circuit board 510. The first conductive pin 513a may be disposed on the fourth surface 510B of the first printed circuit board 510 to receive a signal from the first wireless communication circuit 511 disposed on the third surface 510A and feed it to the first waveguide 610. The third feeding structure 533 may be disposed on the sixth surface 520B of the second printed circuit board 520 to receive a signal from the first waveguide 610 and transmit it to the second wireless communication circuit 521 disposed on the fifth surface 520A of the second printed circuit board 520.

For example, the first conductive pin 513a may feed a signal to the first waveguide 610 through a first conductive via 512a electrically connected to the first wireless communication circuit 511 and passing through the first printed circuit board 510. The third feeding structure 533 may include a conductive pin (e.g., a conductive pin 502a of FIG. 7) electrically connected to the third conductive via 532a. The conductive pin 502a may transmit a signal from the first waveguide 600 to the second wireless communication circuit 521 through the third conductive via 532a electrically connected to the second wireless communication circuit 521 and penetrating the second printed circuit board 520.

According to an embodiment, the second conductive pin 523a may receive a signal from the second wireless communication circuit 521 and transmit the received signal to the second waveguide 620. For example, the second conductive pin 523a may be electrically connected to the second wireless communication circuit 521 disposed on the fifth surface 520A of the second printed circuit board 520 through the second conductive via 522a penetrating the second printed circuit board 520. The second conductive pin 523a may protrude from the sixth surface 520B of the second printed circuit board 520 to feed the signal transmitted from the second wireless communication circuit 521 to the second waveguide 620.

According to an embodiment, the first shield can 513b may surround the first conductive pin 513a, and the second shield can 523b may surround the second conductive pin 523a. A cross section of the first shield can 513b may have a shape corresponding to a cross section of the first waveguide 610 to insert the first waveguide 610. A cross section of the second shield can 523b may have a shape corresponding to a cross section of the second waveguide 620 to insert the second waveguide 620. According to an embodiment, the third feeding structure 533 may include a shield can (e.g., a shield can 503b of FIG. 7) having a shape corresponding to a cross section of the first shield can 513b to insert the first waveguide 610.

For example, in order to provide a structure in which one end of the first waveguide 610 may be coupled to the first feeding structure 513, the first shield can 513b may be disposed on the fourth surface 510B of the first printed circuit board 510 and may surround the first conductive pin 513a protruding from the fourth surface 510B. In order to provide a structure to which the other end of the first waveguide 610 may be coupled, the third feeding structure 533 may include the shield can 503b disposed on the sixth surface 520B of the second printed circuit board 520.

According to one embodiment, one end of the second shield can 523b may be in contact with the sixth surface 520B of the second printed circuit board 520 to surround the second conductive pin 523a, and the other end of the second shield can 523b may accommodate the second waveguide 620.

According to an embodiment, the shape or standard of the first feeding structure 513 and the second feeding structure 523 may be different depending on the type of frequency to be fed. For example, the shape or standard of the first waveguide 610 and the second waveguide 620 may be different depending on the type of frequency transmitted. Since the cross-sections or sizes of the first waveguide 610 and the second waveguide 620 are different, the shape or the size of the shape of the cross section of the first shield can 513b into which the first waveguide 610 is inserted may be different from the shape or the size of the shape of the second shield can 523b into which the second waveguide 620 is inserted.

According to an embodiment, a support member 700 may support the first waveguide 610 and/or the second waveguide 620. For example, the first waveguide 610 and the second waveguide 620 may be disposed on one surface of the support member 700. The first waveguide 610 and/or the second waveguide 600 may be attached to the support member 700 through fusion bonding, an adhesive member, or an adhesive tape. For another example, the support member 700, the first waveguide 610, and/or the second waveguide 620 may be integrally formed. The support member 700 may have a constant thickness. The first waveguide 610 and/or the second waveguide 620 may form a part of the support member 700.

According to an embodiment, a part of the first waveguide 610 and/or the second waveguide 620 may extend along one surface of the support member 700 within the support member 700, and the rest may extend from one surface of the support member 700 to the first printed circuit board 510, the second printed circuit board 520, or an antenna (e.g., an antenna 248 of FIG. 2). For example, a part of the second waveguide 620 may be integrally formed with the support member 700 along one surface of the support member 700, and the rest may extend from one surface of the support member 700 to the sixth surface 520B of the second printed circuit board 520. For example, a part of the second waveguide 620 may be integrally formed with the support member 700 along one surface of the support member 700, and the rest may extend from one surface of the support member 700 to the sixth surface 520B of the second printed circuit board 520.

Referring to FIG. 10C, the electronic device 400 may further include a conductive element 509 and a substrate 507.

According to one embodiment, the substrate 507 may be a substrate distinct from the first printed circuit board 510 and/or the second printed circuit board 520. One surface of the substrate 507 may face the inside of the electronic device 400, and the other side of the substrate 507 may face the outside of the electronic device 400 so as to overlap the opening 419 when the electronic device 400 is viewed from the outside. The second waveguide 620 may be electrically connected to the one surface of the substrate 507, and the conductive element 509 may be disposed on the other side of the substrate 507. The substrate 507 may electrically connect the second waveguide 620 and the conductive element 509.

According to an embodiment, the conductive element 509 may operate as an antenna radiator that forms a directional beam and transmits a signal transmitted through the substrate 507 from the second waveguide 620 electrically connected to the other side of the substrate 507 to the outside. To transmit the signal, the conductive element 509 may be aligned with the opening 419 formed in the housing 410. For example, one surface of the substrate 507 on which the conductive element 509 is disposed may be disposed to overlap the opening 419 when the opening 419 of the housing 410 is viewed vertically from the outside of the electronic device 400. The conductive element 509 may be disposed to correspond to the opening 419. The signal transmitted from the second wireless communication circuit 521 through the second waveguide 620 may be transmitted to the conductive element 509. The signal transmitted to the conductive element 509 may be transmitted to the outside of the electronic device 400 through the opening 419.

According to an embodiment, the conductive element 509 may include a plurality of conductive elements (e.g., a plurality of antenna elements 332, 335, 336 or 338 of FIG. 3). The plurality of conductive elements may be spaced apart from each other. The plurality of conductive elements may form an antenna array (e.g., an antenna array 330 of FIG. 3), and signals radiated from the plurality of conductive elements may be combined to form a beam, and may provide directionality of the beam. According to an embodiment, the housing 410 of the electronic device 400 may include a plurality of openings (e.g., openings 419a of FIG. 9F) corresponding to the conductive elements. The number of the plurality of openings 419a may be corresponded to the number of the plurality of conductive elements. For example, each of the plurality of openings 419a may be disposed to overlap conductive elements corresponding to each of the plurality of openings 419a. The plurality of openings 419a may be spaced apart so that each of the plurality of openings 419a overlaps a plurality of conductive elements spaced apart from each other. The plurality of openings 419a may be paths for transmitting beams radiated from the plurality of conductive elements.

According to an embodiment, the substrate 507 on which the conductive element 509 is disposed may transmit a signal generated inside the electronic device 400 to the outside of the electronic device 400 or may receive a signal transmitted to the electronic device 400 from the outside of the electronic device 400. The waveguide (e.g., the first waveguide 610 or the second waveguide 620) may be a signal line that transmits the signal.

For example, the second wireless communication circuit 521 may be disposed on the fifth surface 520A of the second printed circuit board 520. The second wireless communication circuit 521 may operate as the RFIC that transmits the signal down-converted to the IFIC or up-converts the signal received from the IFIC. The intermediate frequency signal up-converted by the first wireless communication circuit 511 may be transmitted to the second wireless communication circuit 521 through the first waveguide 610. The second wireless communication circuit 521 may up-convert the intermediate frequency signal transmitted from the first wireless communication circuit 511 into a RF signal (e.g., 20 GHz to 300 GHz) and may transmit the RF signal to one end of the second waveguide 620 electrically connected to the second feeding structure 523. Since the other end of the second waveguide 620 is electrically coupled to the other side facing one surface of the substrate 507 on which the conductive element 509 is disposed, the signal that has passed through the second waveguide 620 may be transmitted from the conductive element 509 to the outside of the electronic device 400 through the opening 419.

For example, The RF signal received from the outside of the electronic device 400 to the conductive element 509 through the opening 419 may be transmitted to the second wireless communication circuit 521 through the second waveguide 620 electrically coupled to the other surface facing one surface of the substrate 507 on which the conductive element 509 is disposed. The second wireless communication circuit 521 may down-convert the received RF signal into the intermediate frequency signal and transmit it to the first wireless communication circuit 511 through the first waveguide 610.

According to the above-described embodiment, the first waveguide 610 may provide a signal line for transmitting the intermediate frequency signal up-converted by the first wireless communication circuit or down-converted by the second wireless communication circuit. The second waveguide 620 may provide a signal line for transmitting the RF signal to the outside of the electronic device 400 or for receiving the RF signal from the outside of the electronic device 400. Since a part of the first waveguide 610 and/or the second waveguide 620 are included in a part of the housing 410, the efficiency of the internal space of the electronic device 400 may increase. A transmission loss of a signal of a band of 100 GHz or more transmitted through the first waveguide 610 and the second waveguide 620 may be smaller than a transmission loss of a signal of a band of 100 GHz or more through a microstrip or strip line. The first waveguide 610 and the second waveguide 620 for transmitting a signal of 100 GHz or more may be miniaturized to be disposed inside the electronic device.

Figure 11A:
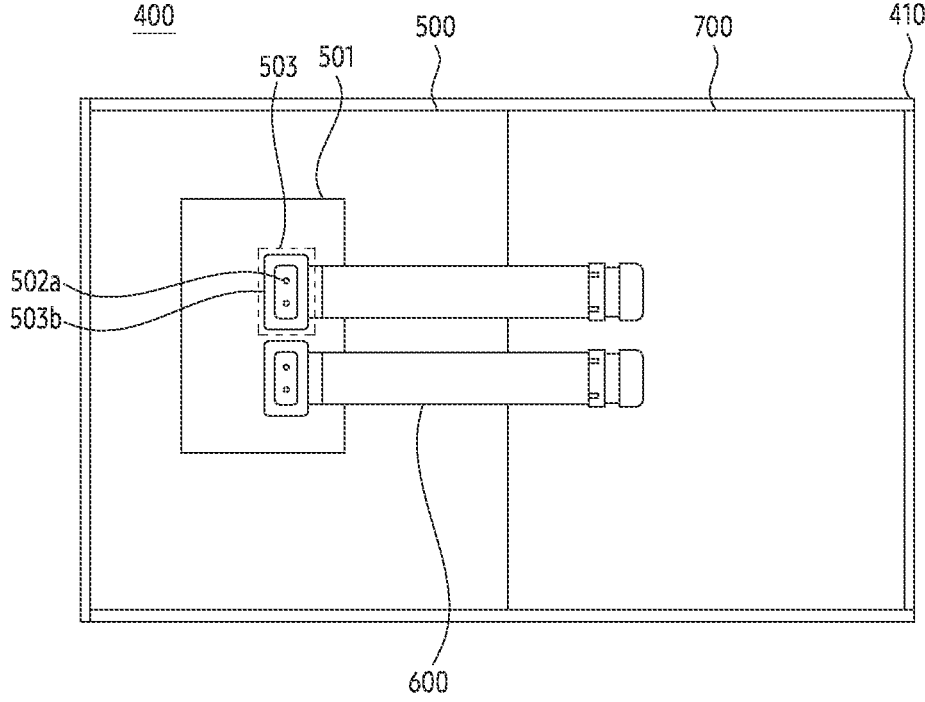
FIGS. 11A and 11B are front views of an electronic device in which a waveguide faces a display surface, according to an embodiment.
Figure 11B:
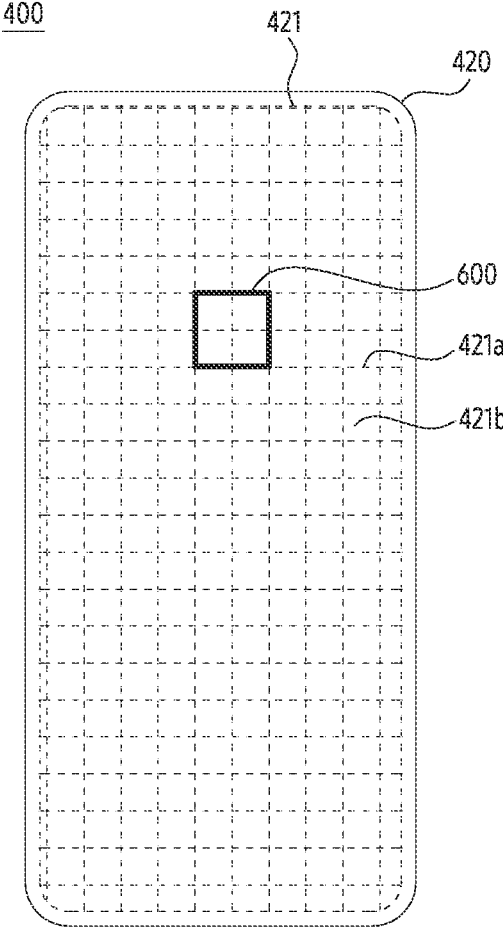
Figure 11C:
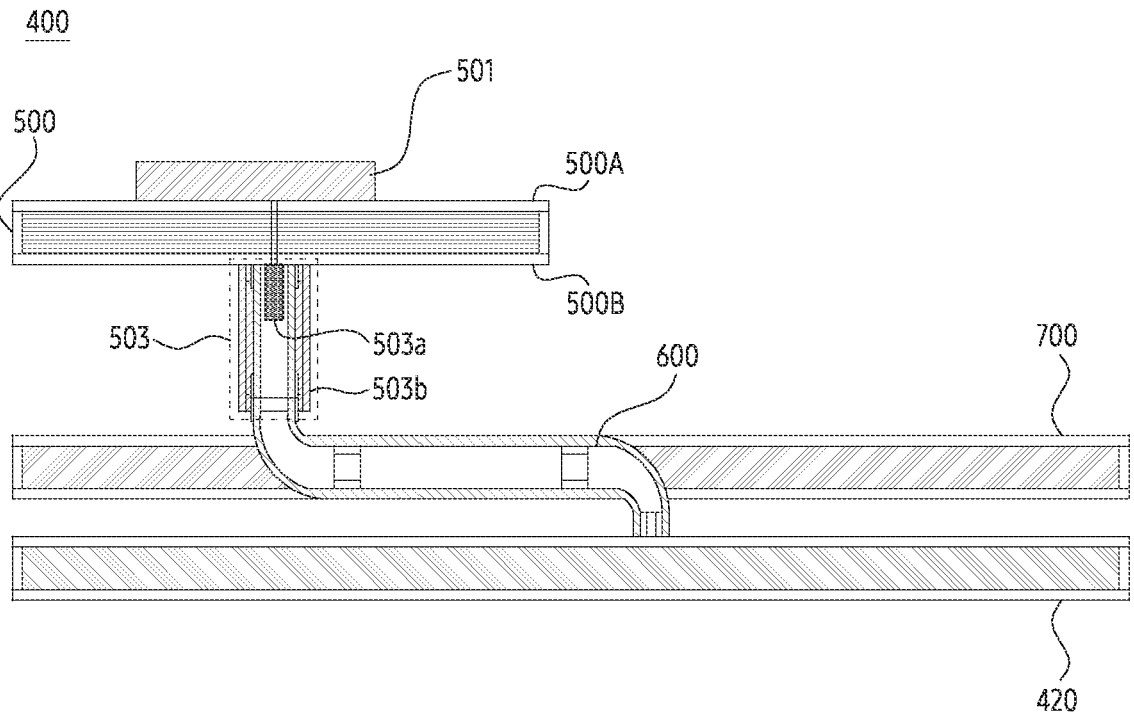
FIG. 11C is a side view of an electronic device in which a waveguide faces a display surface, according to an embodiment.

FIGS. 11A and 11B are front views of an electronic device in which a waveguide faces a display surface, according to an embodiment. FIG. 11C is a side view of an electronic device in which a waveguide faces a display surface, according to an embodiment.

Referring to FIGS. 11A, 11B, and 11C, an electronic device 400 may include a housing 410, a support member 700, a display 420, a waveguide 600, and a printed circuit board 500.

According to an embodiment, the support member 700 may be disposed inside the electronic device 400 to support the display 420. One surface of the support member 700 may face the printed circuit board 500, and the other side of the support member 700 may face the display 420. For example, a part of one surface of the support member 700 may overlap the printed circuit board 500. The other side of the support member 700 may overlap a portion of the display 420.

According to an embodiment, the support member 700 may be disposed inside the electronic device 400 to support the display 420. One surface of the support member 700 may overlap a portion of the display 420.

According to an embodiment, the electronic device 400 may include an antenna (e.g., an antenna 248 of FIG. 2) or an antenna module (e.g., a third antenna module 246 of FIG. 2) which is disposed between the support member 700 and the display 420, for transmitting a signal to the outside of the electronic device 400 toward the display 420 or receiving a signal from the outside through the display 420.

According to an embodiment, the antenna may be an aperture antenna. In order to be disposed between the support member 700 and the display 420 and operate as the aperture antenna facing the display 420, a part of the support member 700 may be removed in a shape corresponding to the aperture antenna.

According to an embodiment, a first end of the waveguide 600 may be connected to a feeding structure 503 disposed on one surface of the printed circuit board 500 for signal feeding. A second end of the waveguide 600 may be connected to an antenna facing the display 420. The cross section of the other end may overlap a part of the display 420. The signal fed to the waveguide 600 may be transmitted to the outside of the electronic device 400 by passing through the display 420 through the antenna facing the display 420. The signal passing through the display 420 from the outside of the electronic device 400 may be transmitted to the waveguide 600 through the antenna facing the display 420.

According to an embodiment, the display 420 may include a touch panel 421 that senses a user's touch. The touch panel 421 may include a plurality of signal lines 421a and empty spaces 421b between the plurality of signal lines 421a. The plurality of signal lines 421a may include a plurality of signal lines 421a vertically crossing each other, thereby forming a constant pattern. The signal fed to the first end of the waveguide 600 may be transmitted to the second end of the waveguide 600 overlapping a part of the display 420 through the waveguide 600 extending toward the display 420. The transmitted signal may be transmitted to the outside of the electronic device 400 through empty spaces 421b of the touch panel 421 extending from a cross section of the second end of the waveguide 600. For example, RF signals in a high frequency band (e.g., 20 GHz to 300 GHz) may penetrate empty spaces 421b between signal lines 421a included in the touch panel 421. The display 420 has been described based on a gap between the touch panels 421, but is not limited thereto. For example, the signal transmitted to the waveguide 600 may be transmitted to the outside through a gap between the electrodes inside the display 420 (e.g., an anode or a cathode) and the signal wires.

According to an embodiment, the display 420 may be disposed in at least a partial area of the support member 700 to be supported.

According to an embodiment, at least a part of the waveguide 600 may extend along one surface of the support member 700 within the support member 700, and at least a part of the waveguide 600 may extend from one surface of the support member 700 to the printed circuit board 500 or the display 420. For example, the support member 700 may be integrally formed with the housing 410. At least a part of the waveguide 600 may be included in the support member 700, and may extend along one surface of the support member 700 to be supported. A first portion of at least a portion of the waveguide 600 may be connected from one surface of the support member 700 to a feeding structure 503 disposed on one surface of the printed circuit board 500. A second portion of at least a portion of the waveguide 600 excluding the first portion may extend toward the display 420 from the other side facing one surface of the support member 700. The signal fed to the waveguide 600 may be transmitted toward the display 420 by the signal line provided by the waveguide 600. The signal transmitted from the waveguide 600 toward the display 420 may pass through empty spaces between signal lines included in the display 420 formed as shown in FIG. 11B to be transmitted to the outside, or may receive a signal from the outside.

According to the above-described embodiment, the waveguide 600 may extend from the feeding structure 503 toward the display 420. A signal passing through the signal line provided by the waveguide 600 may be transmitted to an external electronic device by passing through the display 420 through the empty spaces 421b between the signal lines 421a of the touch panel 421.

Figure 12A:
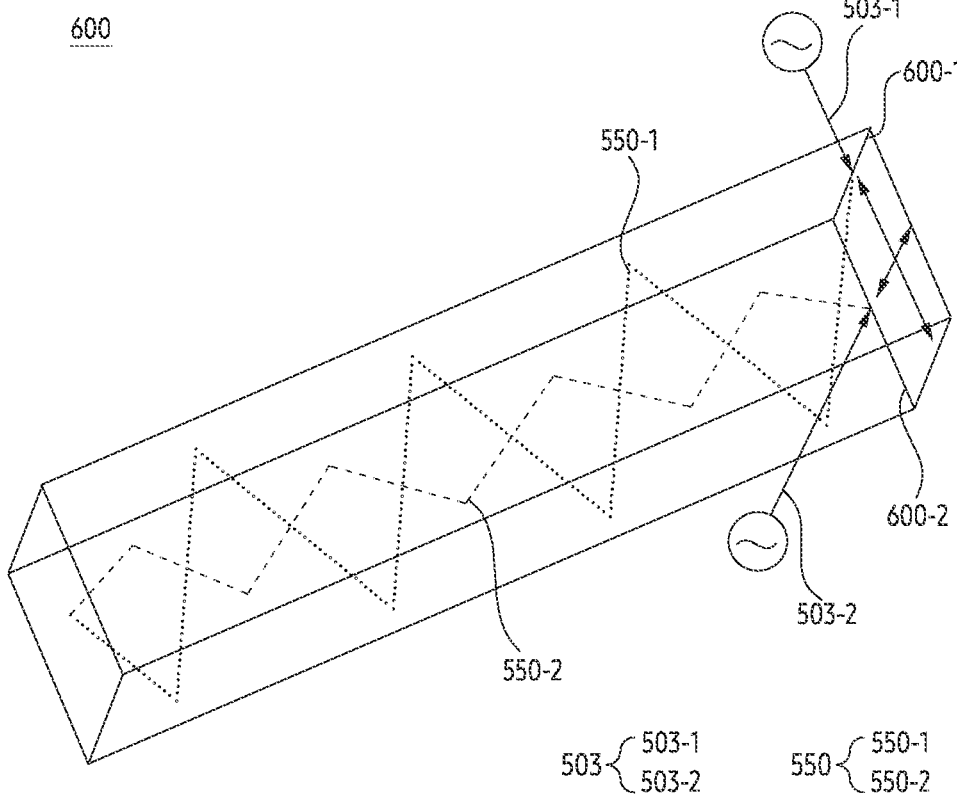
FIG. 12A is a perspective view of a square waveguide illustrating that polarized wave is transmitted according to an embodiment.
Figure 12B:
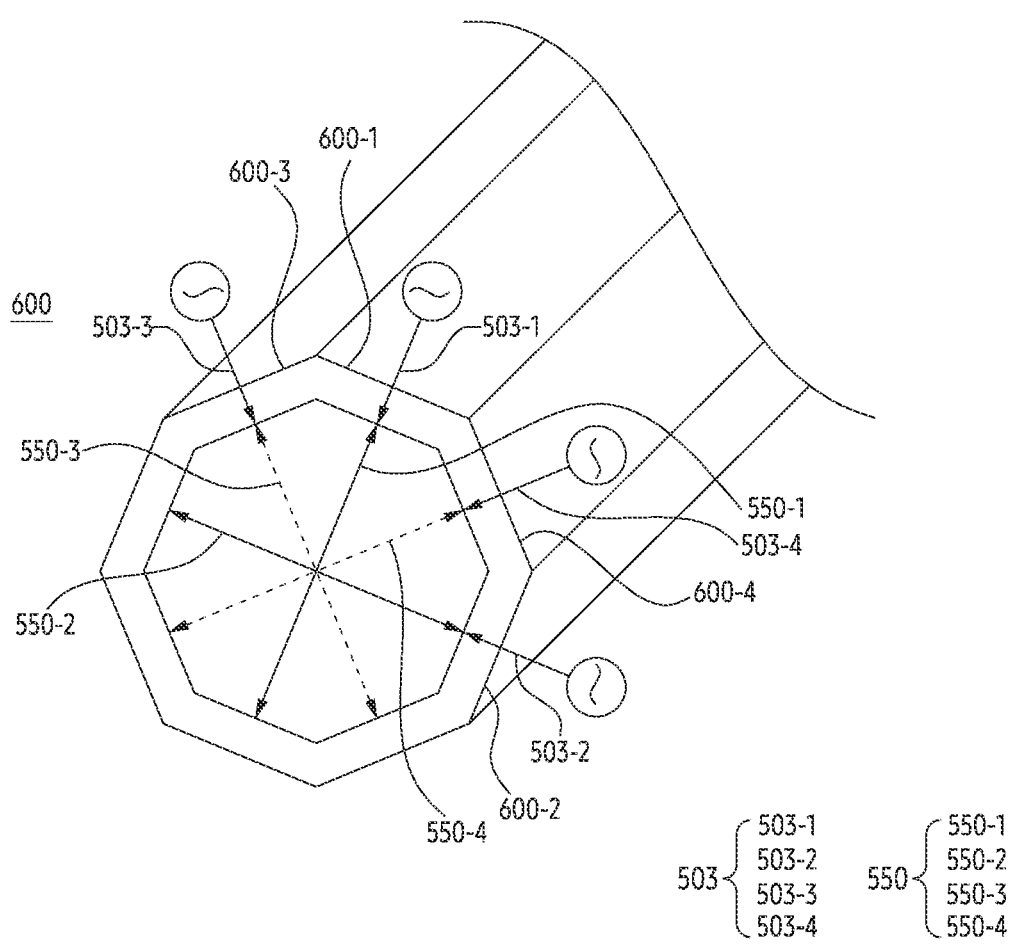
FIG. 12B is a perspective view of an octagonal waveguide illustrating that polarized wave is transmitted according to an embodiment.

FIG. 12A is a perspective view of a square waveguide illustrating that polarized wave is transmitted according to an embodiment. FIG. 12B is a perspective view of an octagonal waveguide illustrating that polarized wave is transmitted according to an embodiment.

Referring to FIG. 12A, a cross-sectional shape of a waveguide 600 may be a quadrangle. A cross section of the square waveguide 600 may be configured to two first peripheries 600-1 parallel to each other and two second peripheries 600-2 in contact with the first periphery and parallel to each other. The first periphery 600-1 may be perpendicular to the second periphery 600-2. A feeding structure (e.g., a feeding structure 503 of FIG. 7) for feeding a signal 550 to the square waveguide 600 may include a plurality of feeding portions. For example, the feeding structure 503 includes a first feeding portion 503-1 for supplying power of a signal to the first periphery 600-1 and a second feeding portion supplying power of a signal to the second periphery 600-2.

According to an embodiment, a first polarized wave 550-1 is fed to the first periphery 600-1 through the first feeding portion, and a second polarized wave 550-2 is fed to the second periphery 600-2 through the second feeding portion. According to an embodiment, the first polarized wave 550-1 may be fed through the first periphery 600-1, and may be a polarized wave in a direction perpendicular to the first periphery 600-1. The second polarized wave 550-2 may be fed through the second periphery 600-2, and may be a polarized wave in a direction perpendicular to the second periphery 600-2. The first polarized wave 500-1 may be perpendicular to the second polarized wave 500-2. For example, the first polarized wave 550-1 may be reflected between two parallel first peripheries 600-1 to move through the waveguide 600. The second polarized wave 550-2 may be reflected between two parallel second peripheries 600-2 to travel through the waveguide 600. Since the first periphery 600-1 is perpendicular to the second periphery 600-2, the first polarized wave 550-1 and the second polarized wave 550-2 may be orthogonal to each other.

Referring to FIG. 12B, the cross-sectional shape of the waveguide 600 may be a regular octagon. The cross section of the octagonal waveguide may be configured to two parallel first peripheries 600-1, two parallel second peripheries 600-2, two parallel third peripheries 600-3, and two parallel fourth peripheries 600-4. The first periphery 600-1 may be perpendicular to the second periphery 600-2. The third periphery 600-3 may be perpendicular to the fourth periphery 600-4. The feeding structure 503 for feeding the signal 550 to the octagonal waveguide 600 may include a plurality of feeding portions. For example, the feeding structure 503 may include a first feeding portion 503-1 that supplies power of a signal to the first periphery 600-1, a second feeding portion 503-2 that supplies power of a signal to the second periphery 600-2, a third feeding portion 503-3 that supplies power of a signal to the third periphery 600-3, and a fourth feeding portion 503-4 that supplies power of a signal to the fourth periphery 600-4.

According to an embodiment, the first polarized wave 550-1 may be fed to the first periphery 600-1 through the first feeding portion 503-1, the second polarized wave 550-2 may be fed to the second periphery 600-2 through the second feeding portion 503-2, the third polarized wave 550-3 may be fed to the third periphery 600-3 through the third feeding portion 503-3, and the fourth polarized wave 550-4 may be fed to the fourth periphery 600-4 through the fourth feeding portion 503-4. The first polarized wave 550-1 may be reflected between two parallel first peripheries 600-1 and travel through the waveguide 600. The second polarized wave 550-2 may be reflected between two parallel second peripheries 600-2 and travel through the waveguide 600. The third polarized wave 550-3 may be reflected between two parallel third peripheries 600-3 and travel through the waveguide 600. The fourth polarized wave 550-4 may be reflected between the two parallel second peripheries 600-2 and travel through the waveguide 600. Since the first periphery 600-1 is perpendicular to the second periphery 600-2, the first polarized wave 550-1 and the second polarized wave 550-2 may be orthogonal to each other. Since the third periphery 600-3 is perpendicular to the fourth periphery 600-4, the third polarized wave 550-3 and the fourth polarized wave 550-4 may be orthogonal to each other.

According to the above-described embodiment, the waveguide 600 formed in a polygonal shape may reduce the influence of each of the plurality of signals 550-1, 550-2, 550-3, and 550-4 fed to the waveguide 600. The waveguide 600 may provide a structure for transmission of a plurality of signals 550. By making the cross-sectional shape of the waveguide 600 different, the number of different signals 550 passing through the waveguide 600 may be adjusted.

Figure 13B:
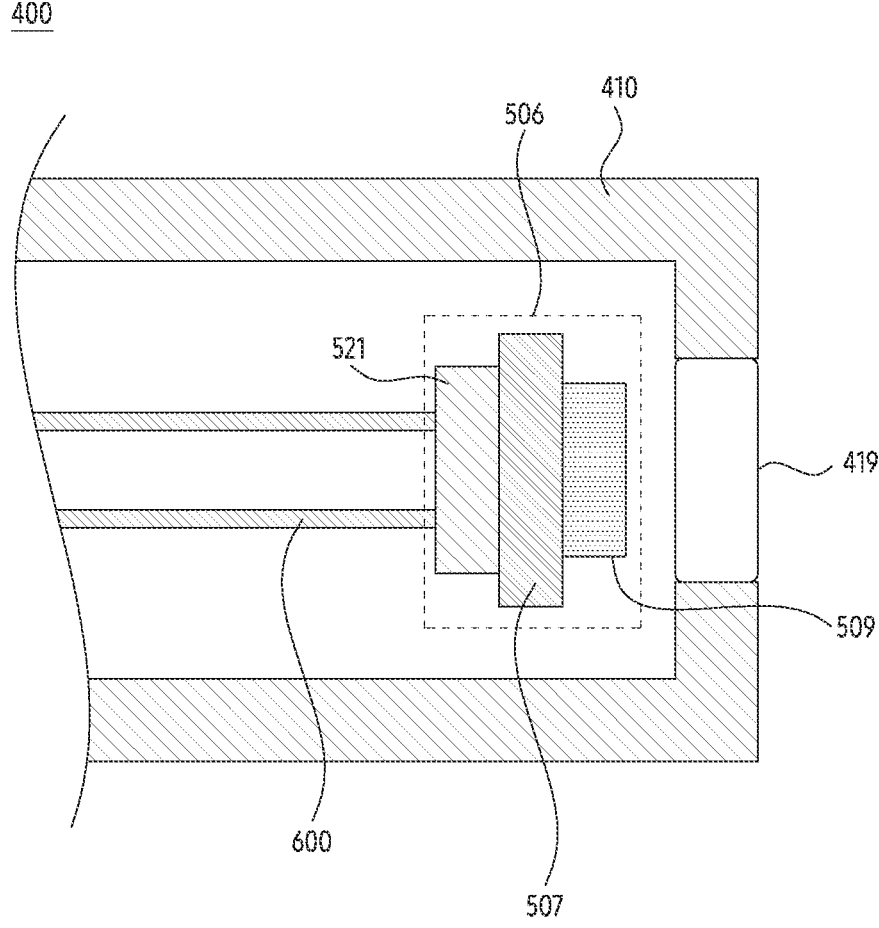
FIG. 13B is a side view of an electronic device including a waveguide and an antenna module according to an embodiment.

FIG. 13A is a block diagram of an electronic device including a waveguide and an antenna module according to an embodiment. FIG. 13B is a side view of an electronic device including a waveguide and an antenna module according to an embodiment.

Referring to FIGS. 13A and 13B, an electronic device 400 may include a printed circuit board 500, a communication processor 505, a first wireless communication circuit 511, an antenna module 506, and a waveguide 600 inside the housing 410. The antenna module 506 may include a substrate 507 in which a second wireless communication circuit 521 and a conductive element 509 are disposed.

According to an embodiment, the communication processor 505 and the first wireless communication circuit 511 may be disposed on a first surface 500A of the printed circuit board 500. The first wireless communication circuit 511 operates as an IFIC (e.g., the fourth RFIC 228 of FIG. 2) that transmits a down-converted signal to the communication processor 505 or receives a signal from the communication processor 505 and up-converts it. A baseband signal generated by the communication processor may be transmitted to the first wireless communication circuit 511 through a transmission line (e.g., a strip line or a microstrip line) included in the printed circuit board 500. The first wireless communication circuit 511 may up-convert the baseband signal generated by the communication processor 505 into an intermediate frequency signal. The first wireless communication circuit 511 may down-convert the intermediate frequency signal received from the waveguide 600 into a baseband signal and transmit it to the communication processor 505 through a transmission line.

According to an embodiment, the second wireless communication circuit 521 may be disposed on one surface of the substrate 507 included in the antenna module 506. The second wireless communication circuit 521 may operate as an RFIC that transmits a down-converted signal to the IFIC or up-converts a signal received from the IFIC. The intermediate frequency signal up-converted by the first wireless communication circuit 511 may be transmitted to the second wireless communication circuit 521 through the waveguide 600. The second wireless communication circuit 521 may up-convert the intermediate frequency signal transmitted from the first wireless communication circuit 511 into an RF signal (e.g., 100 GHz to 300 GHz) and transmit it to the outside of the electronic device 400. The second wireless communication circuit 521 may down-convert the RF signal transmitted from the outside of the electronic device 400 into the intermediate frequency signal and transmit it to the first wireless communication circuit 511 through the waveguide 600.

According to an embodiment, the waveguide 600 may be disposed between the printed circuit board 500 and the antenna module 506. The waveguide 600 may transmit a signal between the first wireless communication circuit 511 and the second wireless communication circuit 521. Through a signal line provided by the waveguide 600, the intermediate frequency signal may be transmitted from the first wireless communication circuit 611 to the second wireless communication circuit 521. The second wireless communication circuit 521 included in the antenna module 506 may down-convert an RF signal received from the outside of the electronic device 400 into the intermediate frequency signal and transmit it to the first wireless communication circuit 511 through the waveguide 600.

According to an embodiment, the second wireless communication circuit 521 included in the antenna module 506 may include a phase shifter (e.g., a phase shifter 238 of FIG. 2). The phase shifter 238 may adjust the phases of a plurality of signals transmitted through the waveguide 600. The phase shifter 238 may be configured to transmit signals having the same phase to the outside of the electronic device 400. The phase shifter 238 may adjust the phases of the plurality of signals in order to form the directionality of the electromagnetic wave of the signal transmitted to the antenna module 506.

According to an embodiment, the communication processor 505 may generate the plurality of signals to have a constant phase difference in order to match the phases of the plurality of signals transmitted through the waveguide 600 and transmitted to the outside. For example, due to the structure of the waveguide 600 (e.g., a corner region 600C of FIG. 8), a phase difference may occur between a plurality of signals. The communication processor 505 may transmit a signal to the waveguide 600 by varying the phases of the plurality of signals by the phase difference of the signal transmitted through the waveguide 600 to the outside of the electronic device 400. Since the plurality of signals are transmitted to the waveguide 600 with different phases, the plurality of signals transmitted from the antenna module 506 to the outside of the electronic device 400 may have the same phase. When each signal whose phase is delayed is transmitted through the waveguide through the communication processor 505, the phase shifter 238 may be omitted. However, it is not limited to thereto. For example, the communication processor 505 may be configured to send a signal having the same phase to the antenna module 506, and the phase shifter 238 may adjust the phases of the plurality of signals in order to provide directivity of electromagnetic waves with respect to signals transmitted to the outside.

According to an embodiment, the antenna module 506 may be disposed on a side surface 400C of the housing 410 of the electronic device 400 in order to transmit or receive a communication signal to or from an external electronic device.

According to an embodiment, the antenna module 506 may be disposed in the internal space of the housing 410.

According to an embodiment, the conductive element 509 included in the antenna module 506 may be disposed on one surface of the substrate 507 included in the antenna module

506 toward at least one opening 419 formed on the side surface 400C of the housing 410 of the electronic device 400 to transmit a signal to the external electronic device or receive the signal from the external electronic device. The at least one opening 419 may be filled with a non-conductive material (e.g., a non-conductive material 410a of FIG. 9D). The at least one opening 419 may overlap the conductive element 509 included in the antenna module 506 connected to the waveguide 600. The wireless communication signal passing through the waveguide 600 may be up-converted by the second wireless communication circuit 521 included in the antenna module 506. The up-converted signal may be radiated by the conductive element 509 disposed on the same substrate 507 as the second wireless communication circuit 521, and may be transmitted to the outside of the electronic device 400 through the at least one opening 419.

According to the above-described embodiment, a transmission loss of a signal of a 100 GHz or more band transmitted through the waveguide 600 may be smaller than a transmission loss of a 100 GHz or more band signal through the microstrip or the strip line. The waveguide 600 for transmitting a signal of 100 GHz or more may be miniaturized to be disposed inside an electronic device.

An electronic device (e.g., the electronic device 400 of FIG. 4) according to the above-described embodiment may comprise a housing (e.g., a housing 410 of FIG. 4) including at least one opening (e.g., opening 419 of FIG. 9A), a support member (e.g., a support member 700 of FIG. 7) disposed in the housing; a display (e.g., a display 420 of FIG. 4) disposed on the support member, a first printed circuit board (e.g., a printed circuit board 500 of FIG. 7) disposed in the housing and including a plurality of layers (e.g., layers 502 of FIG. 7), a first wireless communication circuit (e.g., a wireless communication circuit 501 of FIG. 7) disposed on a first surface (e.g., a first surface 500A of FIG. 7) of the printed circuit board, a feeding structure (e.g., a feeding structure 503 of FIG. 7) on a second surface (e.g., a second surface 500B of FIG. 7) of the printed circuit board electrically connected to the first wireless communication circuit; and a waveguide (e.g., a waveguide 600 of FIG. 7) and electrically connected to the first wireless communication circuit through the feeding structure and to transmit a signal to an outside of the housing, provided from the first wireless communication circuit. According to an embodiment, the waveguide extends along one surface of the support member from the feeding structure, and when looking vertically at the at least one opening, the at least one opening may overlap with a cross section of the waveguide. According to an embodiment, the first wireless communication circuit may transmit or may receive a signal in a frequency band between 20 GHz and 300 GHz through the waveguide.

According to an embodiment, the feeding structure may include a conductive pin (e.g., a conductive pin 503a of FIG. 7) protruding from the second surface and electrically connected to a conductive via (e.g., a conductive via 502a of FIG. 7), the conductive via penetrating the plurality of layers, and a shield can (e.g., a shield can 503b of FIG. 7) surrounding the conductive pin, the shield can disposed on the second surface of the first printed circuit board.

According to an embodiment, the display may include a touch panel (e.g., a touch panel 421 of FIG. 11B) including a plurality of signal lines (e.g., signal lines 421a of FIG. 11B) and empty spaces (e.g., empty spaces 421b of FIG. 11B) between the plurality of signal lines and when the display is viewed from above, a cross section of one end of the waveguide facing the display overlaps at least one of the empty spaces.

According to an embodiment, the at least one openings may include a plurality of slots (e.g., openings 419a of FIG. 9E) arranged along a side surface of the housing.

According to an embodiment, a cross section of the waveguide may include a first periphery (e.g., a first periphery 600-1 of FIG. 12A); and a second periphery (e.g., second periphery 600-2 of FIG. 12A) perpendicular to the first periphery; and the feeding structure may include a first feeding portion (e.g., a first feeding portion 503-1 of FIG. 12A) supplying power of a first signal to the first periphery; and a second feeding portion (e.g., a second feeding portion 503-2 of FIG. 12A) supplying power of a second signal having a polarized wave different from another polarized wave of the first signal to the second periphery.

According to an embodiment, the waveguide may be configured to transmit the first signal (e.g., the first polarized wave 550-1 of FIG. 8) and the second signal (e.g., the second polarized wave 550-2 of FIG. 8) provided from the first wireless communication circuit to an outside of the electronic device.

According to an embodiment, the electronic device includes another waveguide (e.g., waveguides 601, 602, 603 and 604 of FIG. 9B), and wherein each one of the waveguide and the another waveguide may be configured to transmit different signals to the outside of the electronic device.

According to an embodiment, the electronic device may further comprise at least one processor (e.g., a communication processor 505 of FIG. 9A) which transmits at least one signal to the first wireless communication circuit and is disposed on the first printed circuit board; and the first wireless communication circuit may be configured to upconvert a frequency band of the at least one signal.

According to an embodiment, the first wireless communication circuit may further include a phase shifter (e.g., a phase shifter 238 of FIG. 2) configured to adjust a phase of the at least one signal.

According to an embodiment, the at least one signal may include a plurality of signals, and the at least one processor may transmit the plurality of signals having different phases to the first wireless communication circuit.

According to an embodiment, the electronic device may further comprise an antenna module (e.g., an antenna module 506 of FIG. 13A), the antenna module including a second wireless communication circuit (e.g., the second wireless communication circuit 521 of FIG. 10A) distinguished from the first wireless communication circuit (e.g., the first wireless communication circuit 511 of FIG. 10A); at least one conductive element (e.g., a conductive element 509 of FIG. 10C) corresponding to the at least one opening; and a substrate (e.g., a substrate 507 of FIG. 10c) disposed between the at least one conductive element and the second wireless communication circuit and electrically connecting the at least one conductive element and the second wireless communication circuit. According to an embodiment, the at least one opening may be formed on one of a side surfaces of the housing, the waveguide may transmit the signal from the first wireless communication circuit to the second wireless communication circuit. According to an embodiment, the second wireless communication circuit may be configured to upconvert the signal into a frequency band of 20 GHz or more and 300 GHz or less.

According to an embodiment, the first printed circuit board may include a second wireless communication circuit electrically connected to the first wireless communication circuit and disposed on the first surface.

According to an embodiment, the electronic device may further comprise at least one processor disposed on the first printed circuit board, which transmits at least one signal to the first wireless communication circuit. According to an embodiment, the first wireless communication circuit may be configured to transmit a first conversion signal of a first frequency band obtained by up-converting a frequency band of the at least one signal to the second wireless communication circuit, and the second wireless communication circuit may be configured to transmit a second conversion signal of a second frequency band obtained by up-converting the first frequency band of the first conversion signal to the waveguide.

According to an embodiment, the feeding structure may include a conductive pin, protruding from the second surface which electrically connected to a conductive via penetrating the plurality of layers from a region of the first surface corresponding to the second wireless communication circuit, and a shield can including a surface facing the second surface which is opened, wrapping around the conductive pin, disposed on the second surface of the first printed circuit board.

According to an embodiment, the first frequency band may be 20 GHz to 200 GHz, and the second frequency band may be 100 GHz to 300 GHz.

According to an embodiment, an electronic device may comprise a housing including at least one opening; a support member disposed in the housing; a display disposed on the support member; a first printed circuit board (e.g., a first printed circuit board 510 of FIG. 10B) disposed in the housing; a first wireless communication circuit disposed on a first surface (e.g., a third surface 510A of FIG. 10B) of the first printed circuit board; a first feeding structure (e.g., a first feeding structure 513 of FIG. 10B) disposed on a second surface (e.g., a fourth surface 510B of FIG. 10B) of the first printed circuit board opposite the first surface and electrically connected to the first wireless communication circuit. According to an embodiment, the electronic device may further comprise a second printed circuit board (e.g., the second printed circuit board 520 of FIG. 10B) in the housing including a plurality of layers; a second wireless communication circuit disposed on a third surface (e.g., a fifth surface 520A of FIG. 10B) of the second printed circuit board; a second feeding structure (e.g., a second feeding structure 523 of FIG. 10B) disposed on a fourth surface (e.g., a sixth surface 520B of FIG. 10B) of the second printed circuit board opposite the third surface electrically connected to the second wireless communication circuit. According to an embodiment, the electronic device may further comprise a first waveguide (e.g., a first waveguide 610 of FIG. 10B) configured to electrically connected to the first wireless communication circuit through the first feeding structure and to transmit a signal provided from the first wireless communication circuit to the second wireless communication circuit; and a second waveguide (e.g., a second waveguide 620 of FIG. 10B) electrically connected to the second wireless communication circuit through the second feeding structure and to transmit a signal provided from the second wireless communication circuit to an outside of the housing. According to an embodiment, the second waveguide may extend along one surface of the support member from the second feeding structure, and when looking vertically at the at least one opening, the at least one opening overlaps with the cross section of the second waveguide. According to an embodiment, the second wireless communication circuit may transmit or may receive a signal in the frequency band of 20 GHz or more and 300 GHz or less to or from an external electronic device through the second waveguide.

According to an embodiment, the first feeding structure may include a first conductive pin (e.g., a first conductive pin 513a of FIG. 10B) protruding from the second surface and electrically connected to a first conductive via (e.g., a first conductive via 512a of FIG. 10B) penetrating the plurality of layers of the first printed circuit board, and a shield can surrounding the first conductive pin, disposed on the second surface of the first printed circuit board, and the second feeding structure may include a second conductive pin (e.g., a second conductive pin 523a of FIG. 10B) protruding from the fourth surface and electrically connected to a second conductive via (e.g., a second conductive via 522a of FIG. 10B) penetrating the second printed circuit board, and a second shield can (e.g., a second shield can 523b of FIG. 10B) surrounding the second conductive pin, disposed on the fourth surface of the second printed circuit board.

According to an embodiment, the display may include a touch panel including a plurality of signal lines and empty spaces between the plurality of signal lines and when the display is viewed from above, a cross section of one end of the second waveguide facing the display overlaps at least one of the empty spaces.

According to an embodiment, the electronic device may further comprise at least one processor disposed on the first printed circuit board, which transmits at least one signal to the first wireless communication circuit; and the first wireless communication circuit may be configured to transmit a first conversion signal of a first frequency band obtained by up-converting a frequency band of the at least one signal to the second wireless communication circuit through the first waveguide, and the second wireless communication circuit may be configured to transmit a second conversion signal of a second frequency band obtained by up-converting the first frequency band of the first conversion signal to the second waveguide.

According to an embodiment, the second wireless communication circuit may further include a phase shifter configured to adjusts a phase of the second conversion signal.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed:

1. An electronic device comprising:
a housing defining at least one opening;
a support member disposed in the housing;
a printed circuit board (PCB);
first wireless communication circuitry disposed on a first surface of the PCB;
a radiation structure, spaced apart from the at least one opening, disposed on a second surface of the PCB opposite to the first surface, electrically connected to the first wireless communication circuitry; and
a waveguide structure configured to transfer a signal radiated from the radiation structure to the at least one opening, the wave guide structure including:
a first part coupled to the second surface of the PCB to surround the radiation structure, and
a second part extending along a surface of the support member from the radiation structure,
wherein the at least one opening overlaps the second part of the waveguide structure, and
wherein the signal radiated from the radiation structure has a frequency between 20 GHz and 300 GHz.

2. The electronic device of claim 1, wherein the radiation structure includes:
a conductive pin protruding from the second surface and electrically connected to the first wireless communication circuitry through a conductive via, wherein the signal is radiated through the conductive pin, and
a shield can surrounding the conductive pin, the shield can disposed on the second surface of the PCB.

3. The electronic device of claim 1, further comprising a display, the display including a touch panel including a plurality of signal lines,
wherein empty spaces between the plurality of signal lines are defined, and
wherein, when the display is viewed from above, a cross section of an end of the waveguide structure facing the display overlaps at least one of the empty spaces.

4. The electronic device of claim 1, wherein the at least one opening is filled with a non conductive material, and includes a plurality of slots arranged along a lateral side of the housing.

5. The electronic device of claim 1, wherein a cross section of the waveguide structure includes a first periphery, and a second periphery perpendicular to the first periphery, and
wherein the radiation structure includes:
a first radiation portion configured to supply power of a first signal to the first periphery, and
a second radiation portion configured to supply power of a second signal having a polarized wave different from another polarized wave of the first signal to the second periphery.

6. The electronic device of claim 5, wherein the waveguide structure is configured to transmit the first signal and the second signal provided from the first wireless communication circuitry to an outside of the electronic device.

7. The electronic device of claim 1, further comprising: another waveguide structure, and wherein each of the waveguide structure and the other waveguide structure is configured to transmit different signals to the outside of the electronic device.

8. The electronic device of claim 1, further comprising at least one processor configured to transmit at least one signal to the first wireless communication circuitry and disposed on the PCB, and wherein the first wireless communication circuitry is configured to upconvert a frequency band of the at least one signal.

9. The electronic device of claim 8, wherein the first wireless communication circuitry includes a phase shifter configured to adjust a phase of the at least one signal.

10. The electronic device of claim 8, wherein the at least one signal includes a plurality of signals, and wherein the at least one processor is configured to transmits the plurality of signals having different phases to the first wireless communication circuitry.

11. The electronic device of claim 1, further comprising an antenna module, the antenna module including:

second wireless communication circuitry, at least one conductive element corresponding to the at least one opening, and a substrate disposed between the at least one conductive element and the second wireless communication circuitry and electrically connecting the at least one conductive element and the second wireless communication circuitry;

wherein the at least one opening is formed on one of lateral side of the housing, wherein the waveguide structure is configured to transmit the signal from the first wireless communication circuitry to the second wireless communication circuitry, and wherein the second wireless communication circuitry is configured to upconvert the signal into a frequency band of 20 GHz or more and 300 GHz or less.

12. The electronic device of claim 1, wherein the PCB includes a second wireless communication circuitry electrically connected to the first wireless communication circuitry and disposed on the first surface.

13. The electronic device of claim 12, further comprising at least one processor disposed on the PCB, configured to transmit at least one signal to the first wireless communication circuitry;

wherein the first wireless communication circuitry is configured to transmit a first conversion signal of a first frequency band obtained by up-converting a frequency band of the at least one signal to the second wireless communication circuitry, and wherein the second wireless communication circuitry is configured to transmit a second conversion signal of a second frequency band obtained by up-converting the first frequency band of the first conversion signal to the waveguide structure.

14. The electronic device of claim 13, wherein the radiation structure includes:

a conductive pin, protruding from the second surface, electrically connected to a conductive via penetrating the plurality of layers from a region of the first surface corresponding to the second wireless communication circuitry; and a shield can including a surface facing the second surface which is opened, wrapping around the conductive pin, disposed on the second surface of the the PCB.

15. The electronic device of claim 13, wherein the first frequency band is 20 GHz to 200 GHz, and wherein the second frequency band is 100 GHz to 300 GHz.

16. An electronic device comprising:

a housing defining at least one opening;

a support member disposed in the housing;

a display disposed on the support member;

a first PCB disposed in the housing and including a plurality of layers;

first wireless communication circuitry disposed on a first surface of the first PCB;

a first feeding structure disposed on a second surface of the first PCB opposite the first surface and electrically connected to the first wireless communication circuitry;

a second PCB disposed in the housing including a plurality of layers;

second wireless communication circuitry disposed on a third surface of the second PCB;

a second feeding structure disposed on a fourth surface of the second PCB opposite the third surface electrically connected to the second wireless communication circuitry;

a first waveguide structure configured to be electrically connected to the first wireless communication circuitry through the first feeding structure and to transmit a signal provided from the first wireless communication circuitry to the second wireless communication circuitry; and a second waveguide structure configured to be electrically connected to the second wireless communication circuitry through the second feeding structure and to transmit a signal provided from the second wireless communication circuitry to an outside of the housing;

wherein the second waveguide structure extends along one surface of the support member from the second feeding structure, and when the at the at least one opening is viewed vertically, the at least one opening overlaps with the cross section of the second waveguide structure, and wherein the second wireless communication circuitry is configured to transmit or receives a signal in a frequency band of 20 GHz or more and 300 GHz or less to or from an external electronic device through the second waveguide structure.

17. The electronic device of claim 16, wherein the first feeding structure includes:

a first conductive pin protruding from the second surface and electrically connected to a first conductive via penetrating the plurality of layers of the first PCB; and a first shield can surrounding the first conductive pin, disposed on the second surface of the first PCB;

wherein the second feeding structure includes:

a second conductive pin protruding from the fourth surface and electrically connected to a second conductive via penetrating the plurality of layers of the second PCB; and a second shield can surrounding the second conductive pin, disposed on the fourth surface of the second the PCB.

18. The electronic device of claim 16, wherein, the display includes a touch panel including a plurality of signal lines and empty spaces between the plurality of signal lines; and wherein, when the display is viewed from above, a cross section of one end of the second waveguide structure facing the display overlaps at least one of the empty spaces.

19. The electronic device of claim 16, further comprising at least one processor, disposed on the first printed PCB, transmits at least one signal to the first wireless communication circuitry;

wherein the first wireless communication circuitry is configured to transmit a first conversion signal of a first frequency band obtained by up-converting a frequency band of the at least one signal to the second wireless communication circuitry through the first waveguide structure, and wherein the second wireless communication circuitry is configured to transmit a second conversion signal of a second frequency band obtained by up-converting the first frequency band of the first conversion signal to the second waveguide structure.

20. The electronic device of claim 19, wherein the second wireless communication circuitry includes a phase shifter configured to adjust a phase of the second conversion signal.

* * * * *